(12) United States Patent
Minto

(10) Patent No.: US 11,742,501 B2
(45) Date of Patent: Aug. 29, 2023

(54) METHODS AND APPARATUS FOR DECOUPLING REACTANT ACTIVATION AND REACTION COMPLETION

(71) Applicant: Mark Minto, Mariposa, CA (US)

(72) Inventor: Mark Minto, Mariposa, CA (US)

(*) Notice: Subject to any disclaimer, the term of this patent is extended or adjusted under 35 U.S.C. 154(b) by 0 days.

(21) Appl. No.: 17/663,275

(22) Filed: May 13, 2022

(65) Prior Publication Data

US 2022/0271308 A1 Aug. 25, 2022

Related U.S. Application Data

(63) Continuation of application No. 16/840,401, filed on Apr. 5, 2020, now Pat. No. 11,374,242.

(60) Provisional application No. 62/942,172, filed on Dec. 1, 2019, provisional application No. 62/865,319, filed on Jun. 24, 2019, provisional application No. 62/830,419, filed on Apr. 6, 2019.

(51) Int. Cl.
*H01M 8/04* (2016.01)
*H01M 8/04082* (2016.01)
*H01M 8/04701* (2016.01)
*H01M 8/10* (2016.01)

(52) U.S. Cl.
CPC ... *H01M 8/04201* (2013.01); *H01M 8/04701* (2013.01); *H01M 8/10* (2013.01)

(58) Field of Classification Search
CPC ......... H01M 8/04201; H01M 8/04701; H01M 8/04197; H01M 8/04216; H01M 8/04089; H01M 8/04708; H01M 8/04746; H01M 8/04753; H01M 8/04949; H01M 8/04951; H01M 8/10
See application file for complete search history.

(56) References Cited

U.S. PATENT DOCUMENTS

| | | | |
|---|---|---|---|
| 3,300,344 A | 1/1967 | Bray et al. | |
| 4,171,409 A | 10/1979 | Loeb | |
| 4,855,193 A | 8/1989 | McElroy | |
| 5,213,911 A | 5/1993 | Bloom et al. | |
| 5,989,740 A | 11/1999 | Tomimatsu et al. | |
| 6,468,684 B1 | 10/2002 | Chisholm et al. | |
| 7,097,929 B2 | 8/2006 | Lee et al. | |
| 7,318,975 B2 * | 1/2008 | Cho | H01M 8/026 429/514 |
| 7,351,444 B2 | 4/2008 | Wang et al. | |
| 7,582,683 B2 | 9/2009 | Pivovar et al. | |
| 7,687,184 B2 | 3/2010 | Yamauchi et al. | |
| 8,425,986 B2 | 4/2013 | Haile et al. | |
| 8,518,587 B2 | 8/2013 | Fan | |
| 9,281,529 B2 * | 3/2016 | Marzullo | H01M 8/1039 |

(Continued)

*Primary Examiner* — Raymond Alejandro
(74) *Attorney, Agent, or Firm* — Wang Hardoon, P.C.

(57) ABSTRACT

Methods and apparatus for decoupling reactant activation and reaction completion. Various embodiments of the present disclosure leverage electrodynamic inversion principles to provide fuel cell-like operation. In one exemplary embodiment a fuel cell-like apparatus is configured to: create reactant ions (e.g., fuel ions, oxidant ions, etc.) in isolation, transport the reactant ions to a reaction interface, enable a chemical reaction, harvest the resulting electrical current, and eliminate the exhaust products. The exemplary fuel cell-like device decouples the reactants from directly powering the load. Notably, the redox reaction is allowed to proceed at a reaction interface rather than directly at the anode and cathode.

20 Claims, 25 Drawing Sheets

(56) References Cited

U.S. PATENT DOCUMENTS

| | | |
|---|---|---|
| 10,541,439 B2 | 1/2020 | Saakes et al. |
| 2011/0067216 A1 | 3/2011 | Hyde et al. |
| 2015/0125718 A1 | 5/2015 | Minto |
| 2016/0290223 A1 | 10/2016 | Mills |
| 2016/0312370 A1* | 10/2016 | Swiegers ............... C25B 1/30 |
| 2018/0106748 A1* | 4/2018 | Grimm ............... G01N 27/302 |

* cited by examiner

REVERSE BIAS (BELOW IONIZATION VOLTAGE)

METHODS AND APPARATUS FOR DECOUPLING REACTANT ACTIVATION AND REACTION COMPLETION

PRIORITY

This application is a continuation of, and claims the benefit of priority to co-owned U.S. patent application Ser. No. 16/840,401 entitled "METHODS AND APPARATUS FOR DECOUPLING REACTANT ACTIVATION AND REACTION COMPLETION" filed Apr. 5, 2020, which claims the benefit of priority to U.S. Provisional Patent Application Ser. No. 62/830,419 filed Apr. 6, 2019 and entitled "JUNCTION BIAS FIELD ACTIVATED SURFACE LAYER ION CREATION AND ION CONDUCTION DEVICE FOR CHEMICAL REDOX REACTIONS", U.S. Provisional Patent Application Ser. No. 62/865,319 filed Jun. 24, 2019 and entitled "JUNCTION BIAS FIELD ACTIVATED SURFACE LAYER ION CREATION AND ION CONDUCTION DEVICE FOR CHEMICAL REDOX REACTIONS_2", and U.S. Provisional Patent Application Ser. No. 62/942,172 filed Dec. 1, 2019 and entitled "JUNCTION BIAS FIELD ACTIVATED SURFACE LAYER ION CREATION AND ION CONDUCTION DEVICE FOR CHEMICAL REDOX REACTIONS_3", each of which is incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

TECHNICAL FIELD

This disclosure relates generally to the fields of semiconductor lithography and electrochemical cells. Specifically, the present disclosure is directed to electrochemical reactions (such as are present within a fuel cell) and/or structures to enable such reactions.

DESCRIPTION OF RELATED TECHNOLOGY

Fuel cells offer hope in a world of diminishing hydrocarbon resources. Many fuel cells operate at efficiencies as high as 60%. This contrasts with the internal combustion engine in an automobile, which typically operates at 20-25% efficiency. In comparison with piston engines, fuel cells also have lower emissions, and longer periods of steady operation with fewer maintenance requirements. Unfortunately, all fuel cells suffer from problems that have prevented wider adoption of the technology. These problems are related to the material requirements of the design. All fuel cells need specific material components to operate. This is especially true of the parts of the fuel cell where chemical reactions are taking place and where ions flow. The names for these parts of the fuel cell are the anode, cathode and electrolyte.

There are many types of fuel cells, but they share common operating principles. Fuel is ionized near the anode surface. The fuel acquires a positive charge and electrons move to the conducting anode. These electrons travel through a wire to the load, where they provide electrical power. After the load the electrons travel to the cathode. Oxidants are reduced at the cathode. The most common oxidant is oxygen. Near the cathode surface, electrons reduce oxygen. Oxygen acquires a negative charge. Ions diffuse across the electrolyte, leading to a fuel/oxidant reaction. After the reaction reaches completion, the fuel and oxidant have been converted to exhaust. The exhaust fluids are usually water and/or carbon dioxide.

DETAILED DESCRIPTION

Figure 1:
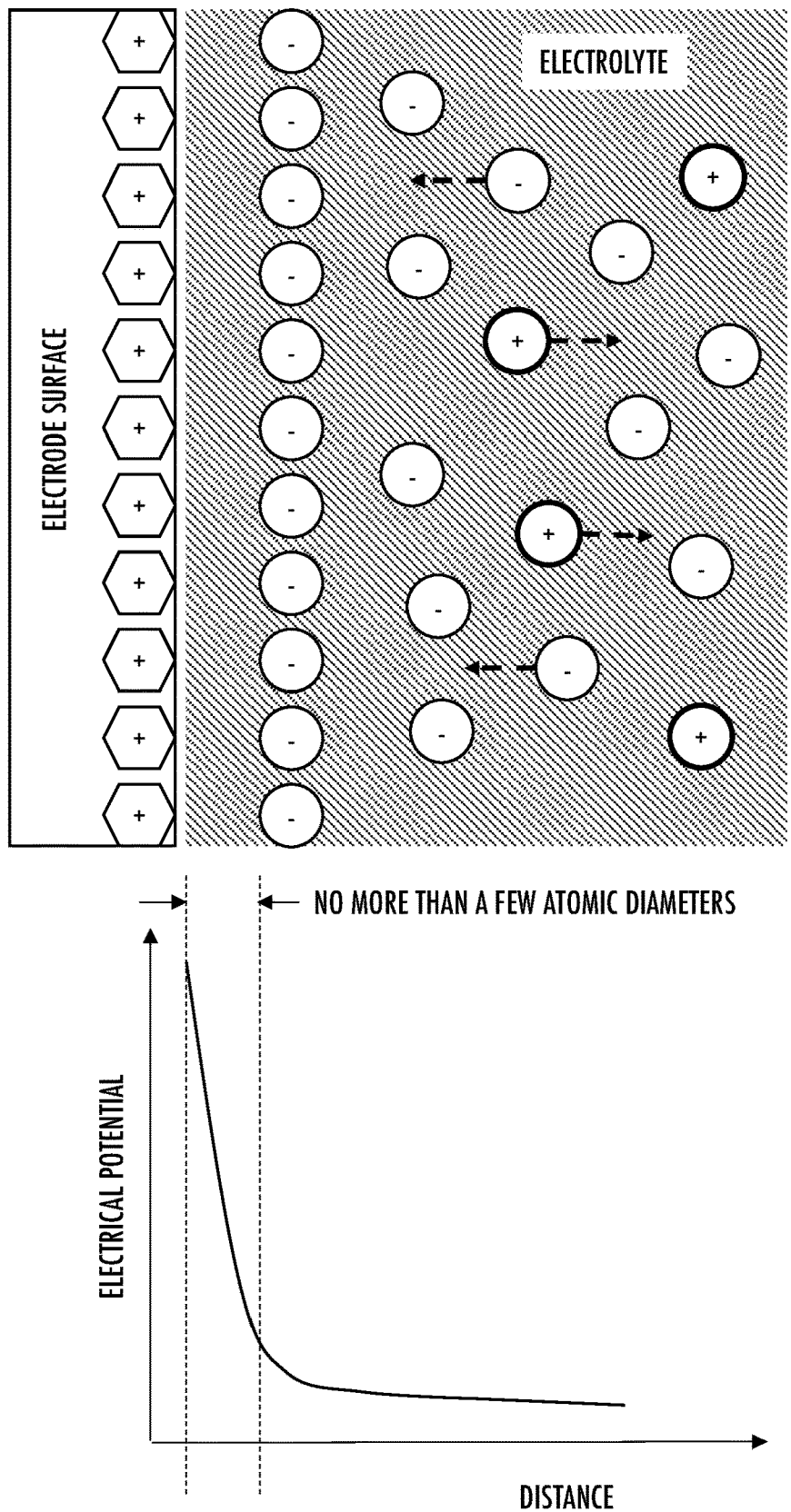
FIG. 1 is a graphical representation of an electrical double layer useful to illustrate various principles described within the present disclosure.

In the following detailed description, reference is made to the accompanying drawings which form a part hereof wherein like numerals designate like parts throughout, and in which is shown, by way of illustration, embodiments that may be practiced. It is to be understood that other embodiments may be utilized, and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without departing from the spirit or scope of the present disclosure. It should be noted that any discussion herein regarding "one embodiment", "an embodiment", "an exemplary embodiment", and the like indicate that the embodiment described may include a particular feature, structure, or characteristic, and that such particular feature, structure, or characteristic may not necessarily be included in every embodiment. In addition, references to the foregoing do not necessarily comprise a reference to the same embodiment. Finally, irrespective of whether it is explicitly described, one of ordinary skill in the art would readily appreciate that each of the particular features, structures, or characteristics of the given embodiments may be utilized in connection or combination with those of any other embodiment discussed herein.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

Anodes, Cathodes, Electrolytes, and the Practicalities of Fuel Cell Operation

In many applications, the anode and cathode are ordinary metal conductors, and operate quite simply as a source and sink of electrical current. However, in a fuel cell, the anode, electrolyte, and cathode may have additional responsibilities. In addition to current conduction, the anode and cathode and electrolyte are responsible for contributing to the activation of the fuel and oxygen. This activation includes ionization of the fuel and oxygen. The electrolyte then conducts these ions across the electrolyte to meet and react. The anode, cathode and electrolyte need to ionize the chemical reactants, and then complete a joined chemical reaction, while simultaneously powering the load and venting exhaust. Hence, the functions of the anode, cathode and electrolyte may include (without limitation): chemical activation, ionization, conduction of ions, reaction completion, exhaust and electrical power production.

Fuel cells are constrained to include specific set of materials and temperatures that permit the creation of fuel and air ions. Commonly, conditions must exist that encourage a chemical equilibrium of neutral and ionized species of oxidant and fuel. Oxygen is the most common oxidant. For a fuel cell to create sufficient oxygen ions, conditions must exist at the cathode/electrolyte interface to create an equilibrium mixture of neutral oxygen, and an ionized oxygen species. Likewise, for a fuel cell to create sufficient fuel ions the, conditions must exist at the anode/electrolyte interface to create an equilibrium mixture of neutral fuel and ionized fuel species. In many cases, the chemical equilibrium between neutral and ionized species is so difficult to achieve that it can only be established by adding expensive electro-catalysts (e.g., platinum, etc.) and/or operating the fuel cell at high temperatures.

In most fuel cell designs, the anode, cathode and electrolyte perform their functions over a short distance. Thickness leads to resistance losses, so fuel cell designers generally keep the components thin to reduce these losses. Yet, even though the layers may be very thin, they usually are of complex composition. For example, the location where oxygen is reduced in the cathode is called the triple phase boundary. This is the location where the electrolyte, gas, and electrically connected catalyst particles all meet. This mixture of materials is a solid, but the anode and cathode also need to be highly porous in order to e.g., permit reactant fluids to enter, and allow exhaust gases to exit. To achieve the triple phase boundary, many fuels cell employ a dispersion of metal catalyst in the porous structures. Others use selected concentrations of metal oxides and/or a specific chemical phase of a solid in order to function correctly. Support materials are included as scaffolding or simply to hold the parts together. More directly, the three components (anode, electrolyte, and cathode) require careful selection to work together. They must operate at the same temperature and catalyze the same joined chemical reactions. Hence, the selection of materials for fuel cells is difficult, and the fabrication of these components is complicated.

More generally, existing fuel cell technologies have a plethora of different problems. Fuel cells often require scarce and expensive catalyst metals to operate. The purity requirements for reactants (fuel and oxygen) are also cost prohibitive; exhaust products and impurities in fuel may also foul components. Fuel cells may require high temperatures to operate, and temperature may require specific restrictions on fuel cell components (anode, cathode, and electrolyte) and material selection. Furthermore, reaction rates may be limited due to limitations of forcing a fluid through a porous solid. Various other manufacturing considerations may limit fuel cell construction (intricate positioning and fine geometry layering, etc.)

The Electrical Double Layer (EDL) Bottleneck

FIG. 1 is a graphical representation of an electrical double layer useful to illustrate various principles described within the present disclosure. FIG. 1 shows an electrode surface in contact with an electrolyte having high salt concentrations. As shown in FIG. 1, when voltage is applied to an electrode, charge buildup at the electrical double-layer is increased. Charge on the electrode (also referred to herein as the "electrode charge") is composed of negatively charged electrons ("−") or positively charged holes ("+"). The second layer, located at the outer Helmholtz plane, is composed of complementary ions that are attracted to charge on the electrode. The electric field in the double layer is significantly quenched between the electrode surface and the outer Helmholtz plane. The remaining electrical field is quenched beyond the Helmholtz plane in the diffuse layer.

For reference, a graphical representation of electrical potential as a function of distance is provided. The high concentration of salt in the electrolyte allows charge carriers to move with very little resistance. As shown therein, the electric potential falls off quickly and may be quenched within a few atomic diameters of the electrode surface. More directly, the electrical double layer "screens" the majority of the electrolyte ions from the electric field. As a practical matter, concentrated electrolytes can create electrical double layers that are very narrow (a few atomic diameters). This can result in enormous electrical field strengths in the double layer, potentially as high as one Volt/Angstrom (V/A).

Existing battery and fuel cell technologies harness chemical potential to create electrical potential. The chemical potential difference between the products and reactants is used to create the electrical potential that powers the load. Notably, the electrical double layer, near the surface of an electrode, is often the location where chemical potential is exchanged to form electrical potential (fuel cell), or where electrical potential is exchanged to form chemical potential (charging a battery).

Existing fuel cell designs are bottlenecked by the requirement to form activated reactants near the electrical double layer, adjacent to the electrode surface (i.e., a chemical reaction interface). As a practical matter, the activation of hydrocarbon reactants is so difficult that fuel cell designers are limited to high temperature designs (e.g., solid oxide fuel cell, molten carbonate fuel cell, etc.) or the use of expensive catalysts (platinum rhodium alloys) to achieve fuel activation near the anode surface.

Improved solutions for fuel cell technology are needed. Ideally, such fuel cells should operate near room temperature, without the need for expensive catalysts.

Exemplary Electrodynamic Inversion of Bipolar Membrane Electrodialysis

As a brief aside, bipolar membranes are a special type of layered ion exchange membrane that are constructed from two (2) overlaid polymer layers; an anion exchange membrane (AEM) that is only permeable for anions (negatively charged ions), and a cation exchange membrane (CEM) that is only permeable for cations (positively charged ions). A bipolar junction is created where the AEM and CEM layers are in direct contact. Bipolar membranes are commonly used for e.g., bipolar membrane electrodialysis where water is split into protons ($H^+$) and hydroxide ions ($OH^-$) at the bipolar junction. In electrodialysis, a single reactant (water) is split into two products ($H^+$, $OH^-$) at the bipolar junction; the resulting products diffuse away from the bipolar junction via their corresponding exchange membranes. The chemical potential difference of the products ($H^+$, $OH^-$) minus reactants (water), is positive, thus the electrodialysis of water consumes energy (0.83V EDBM up to 1.23V complete electrolysis).

Figure 2:
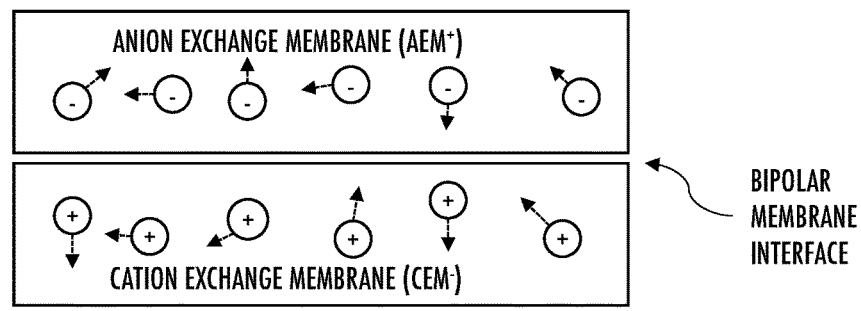
FIG. 2 is a graphical representation of electrical potential applied to a bipolar membrane useful to illustrate various principles described within the present disclosure.
Figure 2:
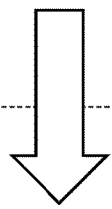
Figure 2:
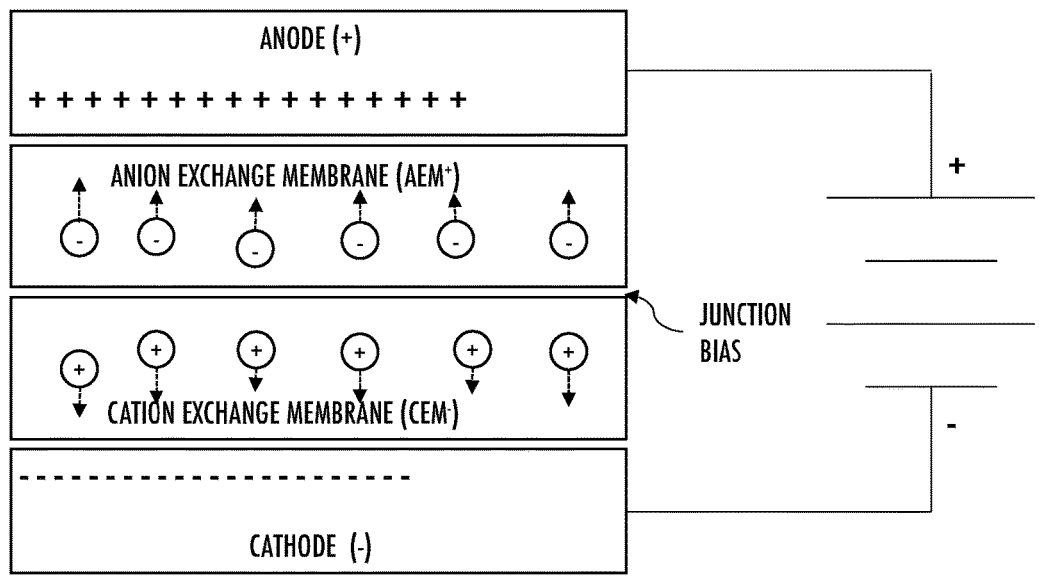

FIG. 2 is a graphical representation of electrical potential applied to a bipolar membrane useful to illustrate various principles described within the present disclosure. The exemplary bipolar membrane comprises two layers: an anion exchange membrane (AEM) and a cation exchange membrane (CEM). CEM are usually comprised of a fluorinated polymer with negatively charged sites (anions) that allows positive ions (cations) to freely diffuse throughout. AEMs usually utilize various alkaline stable polymeric materials as the host material that allow negative ions (anions) to diffuse via immobile positively charged sites (cations). The shared interface between the AEM and CEM is a bipolar junction. The bipolar junction is an ionic depletion region that prevents ions from passing between the two exchange membranes, similar to the electron depletion region in a semiconductor diode. In other words, the bipolar membrane is ionically non-conductive when no external electrical potential is applied.

As shown in FIG. 2, the bipolar membrane can be locally "reverse biased" by applying an external electrical potential (e.g. a positive charge is applied to the AEM, and a negative charge is applied to the CEM). At low voltages, anions are pulled toward the anode, and cations are pulled toward the cathode. Additionally, the external electrical potential induces an electrostatic potential at the bipolar membrane interface that further deters ionic charge carriers (positively/negatively charged ions) from passing across the bipolar membrane. Functionally, the bipolar membrane operates in a non-linear conduction manner, analogous to the bipolar junction of a PN-diode (well known within the electrical arts); for this reason, the electrostatic potential (a voltage step) is also referred to herein as a "junction bias".

As a brief aside, a bipolar membrane behaves similarly to a silicon semiconductor, but there are important differences. Negative ions (anions) are mobile and freely move via the positively charged sites of the AEM, similar to electrons in an N-type semiconductor. In contrast, positive ions (cations) are mobile and freely move via the negatively charged sites of the CEM. This differs from physical silicon semiconductors; specifically, in silicon semiconductors, an electron moves from one lattice location into an electron hole, the space vacated by the electron creates a new electron hole. Even though colloquially holes are said to be "mobile" in P-type semiconductors, only electrons are actually moving.

As another important aside, the AEM and CEM are physically charged polymer lattices (which are immobile). Increasing the reverse bias voltage in a silicon PN-diode increases the width of the depletion region, as electrons and holes "move" away from the semiconductor bipolar junction. However, increasing the reverse bias voltage across an ionic bipolar membrane does not increase the width of the depletion region because the positively charged sites of the AEM and negatively charged sites of the CEM cannot move; instead, the induced voltage step at the bipolar junction increases.

Figure 3:
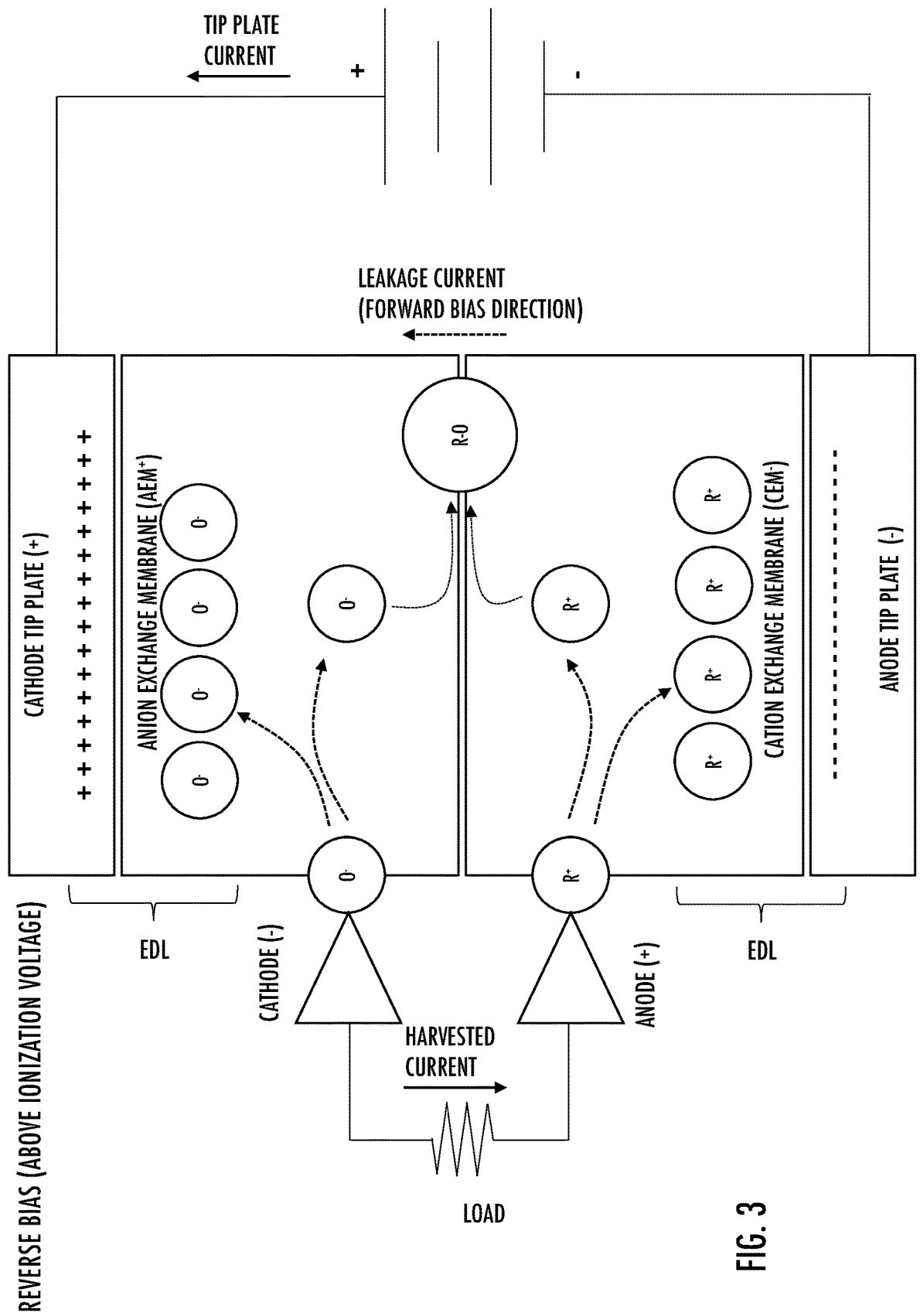
FIG. 3 is a graphical representation of an exemplary electrodynamic inversion of a bipolar membrane to enable a chemical redox (reduction-oxidation) reaction, in accordance with the principles described herein.

Referring now to FIG. 3, a graphical representation of an exemplary electrodynamic inversion of a bipolar membrane to enable a chemical redox (reduction-oxidation) reaction is presented. Redox reactions are chemical reaction characterized by the transfer of electrons between a reducing agent (the reductant) and the oxidizing agent (the oxidant). In one exemplary embodiment, a reverse biased bipolar membrane permits electron sharing across the bipolar junction, thereby enabling redox reactions to occur.

In the illustrated embodiment, an anode is coupled to the CEM and a cathode is coupled to the AEM (for reasons made abundantly clear hereinafter, the naming convention is chosen consistent with conventional fuel cell components). Additionally, the anion exchange membrane (AEM) is connected to a cathode tip plate, and the cation exchange membrane (CEM) is connected to an anode tip plate. The cathode tip plate and anode tip plate are charged with a tip plate potential that applies an external electrical potential to reverse bias the bipolar membrane; a junction bias voltage step is created thereat.

At reverse bias voltages that are above the ionization voltage for fuel and oxidants, positive charge is pulled off the anode to ionize nearby fuel (reductant). Similarly, negative charge is pulled off the cathode which ionizes nearby oxygen (oxidant). The newly created anions and cations are activated reactants that readily diffuse throughout their respective exchange membranes. In high mobility electrolytes, the reverse bias voltages can be quenched at distances that are quite close to the anode tip plate and cathode tip plate. Thereafter, ions can freely diffuse throughout their respective exchange membranes. Specifically, positively charged fuel ions and negatively charged oxidant ions can diffuse to the bipolar junction, where they have sufficient chemical potential to react.

Even though the activated reactants cannot cross the bipolar junction, their initial adiabatic activation conserves the chemical potential necessary to allow the chemical redox reaction to proceed; more directly, the chemical potential stored in the activated reactants exceeds the junction bias voltage step. In the context of a semiconductor diode, charge carriers (electrons and holes) only carry electrical potential, however chemical ions have both an electrical charge (electrical potential) and a separate chemical potential. Thus, while a semiconductor diode cannot pass current while reverse biased, the exemplary ionic diode can leak "current" in the forward bias direction. Specifically, the current in the forward bias direction is created by the chemical potential stored in the reactant ions. The reactant ions meet at the bipolar junction and have sufficient chemical potential to react; during the subsequent redox reaction, electrons transfer from a set of orbitals on the reductant ion (called the donor orbitals) into a set of orbitals on the oxidant ion (called the acceptor orbitals). The resulting product of the redox reaction is neutrally charged. Notably, the electron transference/sharing occurs in the forward biased direction. In other words, under conditions of reverse bias, the ionic diode incurs a current leakage in the forward bias direction, due to the residual chemical potential stored in reactant ions.

In the instant case described supra, the adiabatic ionization of reactants retains the chemical potential difference between products and reactants, and this chemical potential may be used to power the load. As shown in FIG. 3, potential is applied to the tip plates in reverse bias, and this creates a voltage step at the bipolar interface between the cathode and anode electrolytes. The reverse bias potential is slowly increased until the voltage step at the bipolar interface exceeds the load voltage. Shortly thereafter, charge begins slipping/leaking off the anode and cathode tips. Charge released by the anode tips forms fuel ions. Charge released from the cathode tips forms oxygen ions. Lithographic dimensions permit the rapid diffusion of reactants to the bipolar interface. Chemical potential stored in the reactant fuel and oxygen ions, allow these ions to react at the bipolar interface creating products (exhaust). Since the ionized reactants are consumed to create neutrally charged products; the neutralization of charged ions causes additional replacement reactants to be ionized. Specifically, charge pulled off the anode and cathode create reactant ions. The diffusion of these reactant ions to the bipolar interface results in an electric/ionic current in the forward bias direction.

Unlike electrodialysis described supra, the electrodynamic inversion of bipolar membrane electrodialysis brings two activated reactant ions together at a reaction interface to synthesize the resultant product(s). One particularly important observation is that the reactants are activated and then transported in their activated state to a reaction interface. Decoupling reactant activation from the reaction interface (where the chemical reaction is allowed to proceed) avoids the electrical double layer limitations of existing fuel cell designs. Additionally, however, the decoupled structure described supra provides other benefits. As but one such example, the activation of the reactants can be performed with much more oxidizing and reducing power. Notably, the ability to adiabatically form reactant ions with greater electrochemical potential may eliminate the need for high temperatures and/or expensive electrocatalysts required of existing fuel cell technologies.

As used herein, the term "electrostatic" refers to electrical charges that are stationary. In contrast, the term "electrodynamic" refers to charge carriers and/or ions that are mobile.

Various embodiments of the present disclosure leverage the electrodynamic inversion principles described above to: activate reactant ions (e.g., fuel ions, oxidant ions, etc.), transport the activated reactant ions to a reaction interface, enable a redox reaction, harvest the released potential energy, generate additional reactant ions, and eliminate the exhaust products. The following discussion presents two (2) variants which leverage the principles described herein: (i) a surface layer ion conduction variant and (ii) a layered electrolyte variant.

Surface Layer Ion Conduction Variant (Surico)—

Figure 4:
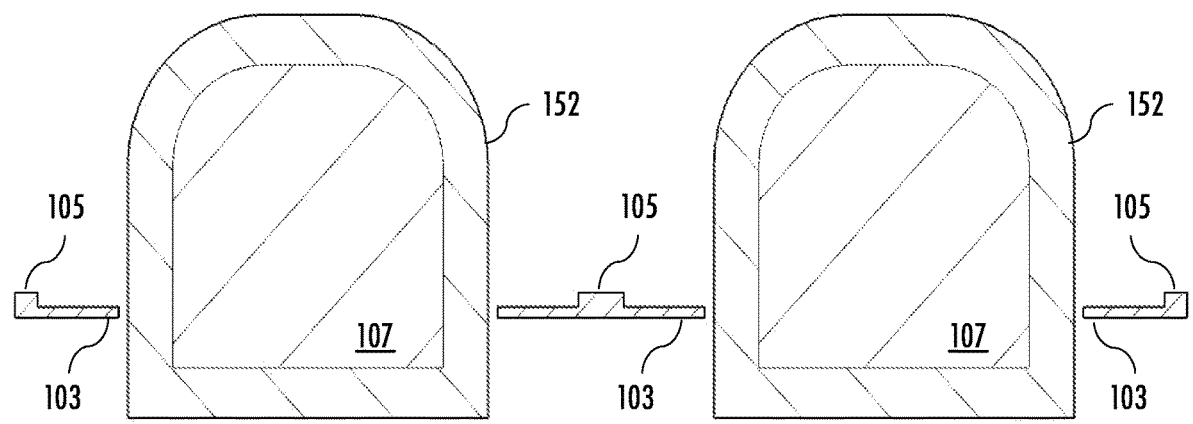
FIGS. 4-5 are cross-sectional and perspective views of an exemplary tip plate sub-assembly, useful in conjunction with various embodiments described herein.
Figure 5:
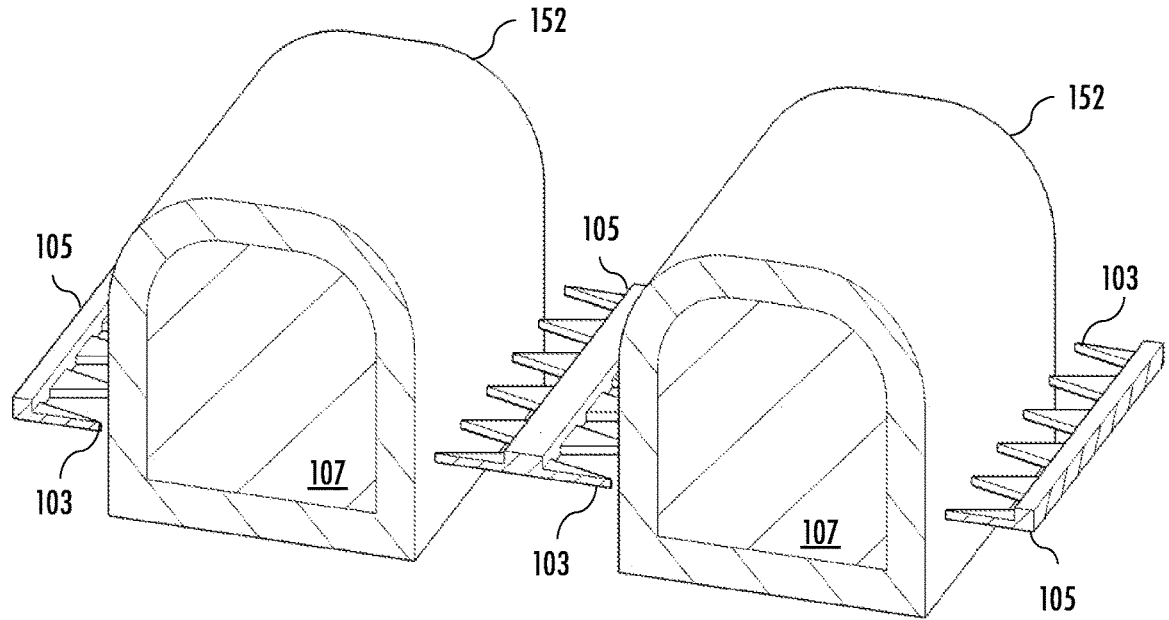

The following discussion provides an overview of the structure, function, and operation of a surface layer ion conduction cell (also referred to throughout as a "Surico cell"). FIG. 4 is a cross-sectional view of an exemplary tip plate sub-assembly used within the Surico cell. FIG. 5 provides a perspective view of the exemplary tip plate sub-assembly.

The exemplary tip plate sub-assembly includes a current collector (105) that connects to a chain of tips (103). The tips (103) lie proximate to an insulating dielectric wall (152). The dielectric wall encapsulates an electrical conducting material (107) (referred to herein as the "tip plate"). The exemplary tip plate construction may be used for either (or both of) an anode array and cathode array. As used herein, the term anode refers to an electrode that releases positive charge; the term "cathode" refers to an electrode that releases negative charge. As used herein, the term "fuel cell-like operation" refers to the collection of electrical potential across an anode and cathode to drive a load.

Figure 6:
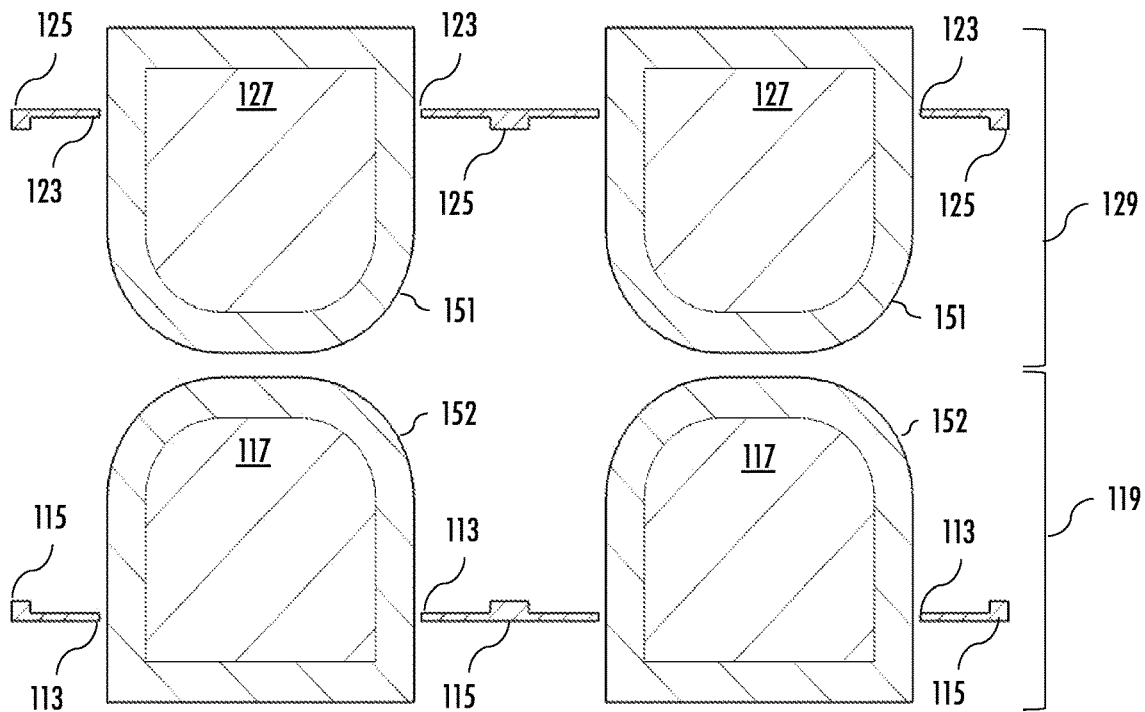
FIGS. 6-7 are cross-sectional and perspective views of an exemplary Surface Layer Ion Conduction (Surico) cell assembly, useful in conjunction with various embodiments described herein.
Figure 7:
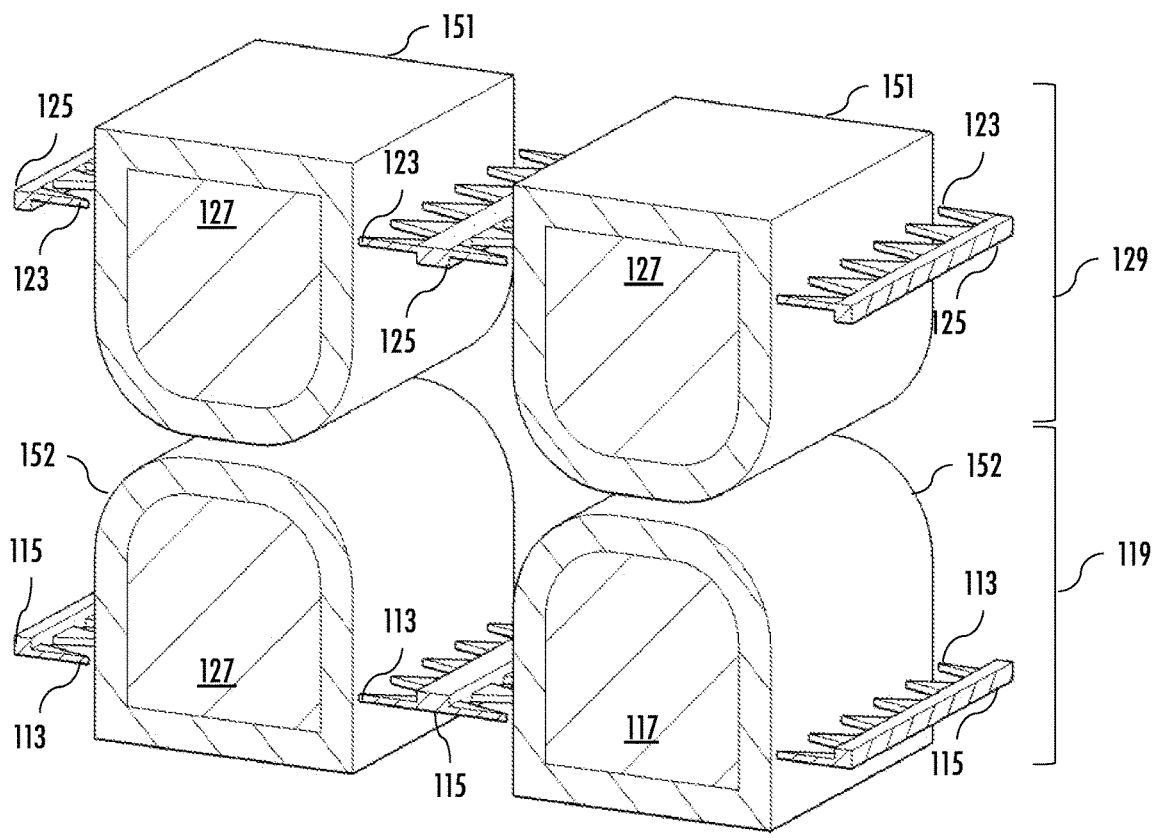

FIG. 6 is a cross-sectional view of the Surico cell assembly. FIG. 7 provides a perspective view of the exemplary Surico cell assembly. The Surico cell assembly includes two (2) tip plate assemblies configured as a cathode array (129) and an anode array (119). As shown therein, the cathode array (129) is positioned (inverted) over an anode array (119). The exemplary cathode current collector (125) electrically connects the cathode tips (123). The cathode tips face the cathode insulating dielectric (151). In one embodiment, the cathode tips (123) are positioned within nanometers of the insulating dielectric wall (151). In one such variant, the cathode tips are atomically thin (possibly terminating to a single atom). The cathode insulation dielectric (151) encapsulates and electrically insulates the cathode tip plates (127).

Similarly, the exemplary anode array (119) includes the anode current collector (115) which electrically connects the anode tips (113). The anode tips (113) face the anode insulating dielectric (152). In one embodiment, the anode tips (113) are positioned within nanometers of the insulating dielectric wall (152). In one such variant, the anode tips (113) are atomically thin (possibly terminating to a single atom). In one exemplary embodiment, the anode and cathode arrays are separated by a gap. In one such variant, the gap may be reduced to atomic dimensions; e.g., the gap may be only a few Angstrom lengths.

Figure 8:
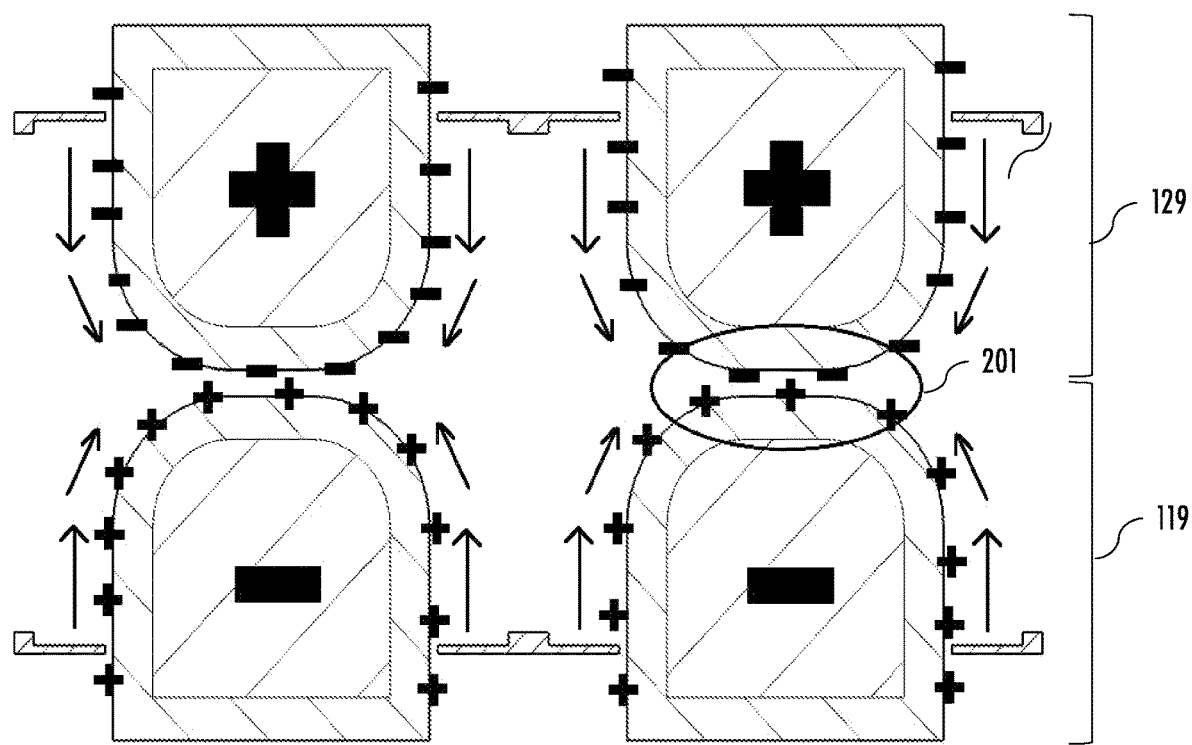
FIG. 8 depicts a cross-sectional view of the Surface Layer Ion Conduction (Surico) cell during fuel cell-like operation.

FIG. 8 depicts a cross-sectional view of the Surico cell during fuel cell-like operation. During operation, the cathode array (129) and its corresponding set of electrodes create oxidant ions, and the anode array (119) and its corresponding set of electrodes create fuel ions. The fuel and oxidant ions are transported via surface layer conduction to the reaction interface 201 via their respective dielectric surfaces.

As a brief aside, charging the tip plates polarizes the insulating dielectric walls. The permittance of the dielectric will attract charged ions (of equal and opposite charge) but does not allow current flow through the dielectric. The charged tip plates and the charged ions form a pseudo-electrical double layer, at the location of closest approach between the curved dielectric surfaces. The charged reactant ions lay on an equipotential surface and are free to migrate along the surface of the dielectric. Since similarly charged ions repel one another, they will attempt to uniformly distribute themselves across the entire surface of the insulating dielectric surface.

Referring back to FIG. 8, the cathode tip plate (127) has been charged with a positive voltage, shown schematically as a "+" sign. The positively charged cathode tip plate pulls negative charge off of its cathode electrode tips forming negative oxidant ions (−) which can freely slide (via surface layer ion conduction) across the cathode dielectric surface. Similarly, the anode tip plates (117) are charged with a negative voltage, shown schematically as a "+" sign. The negative voltage of the anode tip plates pulls positive charge off the anode electrode tips, forming fuel ions. The positive fuel ions freely slide across the surface of the anode dielectric.

Charging the tip plates pulls/pushes electrical charge to/from the tip of the electrode nearest the tip plate. In other words, the electrodes experience an electrical field at the point of the tip. Empirically, the electrical field may be highly concentrated due to the tip geometry. The electrical field ionizes fuel and oxidants that are directly exposed to it. The resulting ions are attracted to and collected on the surface of the tip plate dielectric. Specifically, negatively charged oxidant ions are attracted to the positively charged cathode tip plate and positively charged fuel ions are attracted to the negatively charged anode tip plate. Once positively charged fuel ions are brought within close proximity (a few Angstroms) of the negatively charged oxidant ions and allowed to react, the resulting product of the redox reaction is neutrally charged, freeing space for other charged ions to spread into the reaction interface (circled region 201).

Figure 9:
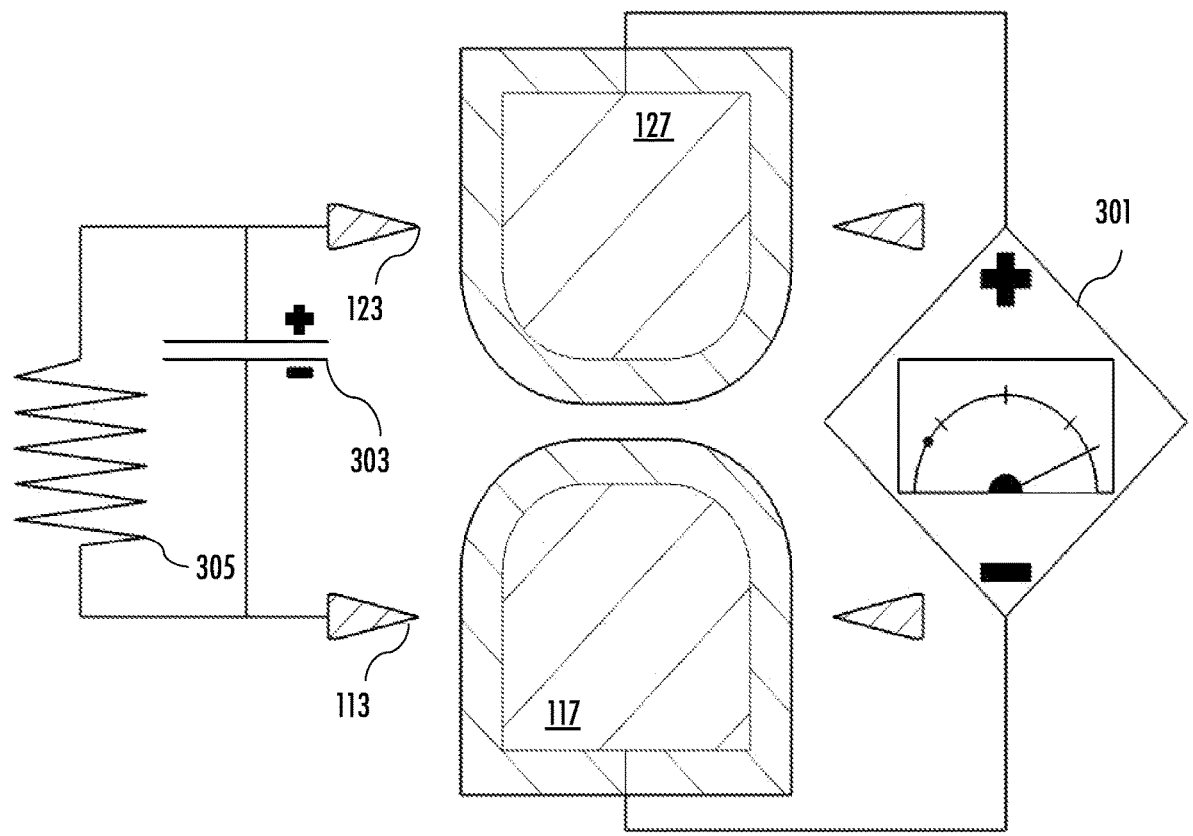
FIG. 9 provides a cross-sectional view of the Surface Layer Ion Conduction (Surico) cell configured to enable self-sustaining fuel cell-like operation.

FIG. 9 provides a cross-sectional view of the Surico cell configured to enable self-sustaining fuel cell-like operation. As shown therein, the Surico cell is connected to a schematic image voltage supply (301). The voltage supply (301) may include an embedded voltmeter. The voltage supply has connections to the anode tip plate (117) and cathode tip plate (127). Additional components include the load (305) and a storage capacitor (303), shown in schematic. The load (305) and capacitor (303) connect to the anode (113) and cathode (123). In addition to the voltage supply (301) charging the tip plates, a voltage supply may additionally offset the anode tip plate from the anode, or cathode tip plate from the cathode, or both.

During operation, the negative charge that is continually pulled from the cathode electrode tips (123) and carried away by the oxidant ions, and the positive charge that is continually pulled from the anode electrode tips (113) and carried away by the fuel ions form a completed electrical circuit with the load (305) and storage capacitor (303). As previously alluded to, the adiabatic creation of fuel and oxygen ions conserves reaction energy and stores this energy as chemical potential. The electrical potential applied to the tip plates may transiently increase the chemical potential of the reactant ions, but this transient increase does not affect the load. Each time the tip plates are charged with current, a much longer and larger ionic current is created along the surface of the dielectrics. The current of reactant ions is several orders of magnitude larger than the current required to cyclically charge the tip plates. In other words, the electrical energy required to charge the tip plates ($QV_{plates}$), is a small fraction of the electrical energy produced by the cell ($QV_{cell}$). Hence the Surico cell is energy efficient and self-sustaining.

In one exemplary embodiment, the Surico cell can be kept at temperatures to vent exhaust (e.g., $CO_2$, $H_2O$). For example, a proton ($H^+$) and hydroxide ($OH^-$) based Surico cell can be heated to approximately the boiling point of water to allow steam to vent off. Notably, the operating temperature of the Surico cell is a function of the exhaust products (rather than reactant activation). In other words, the exhaust cycle is decoupled from the chemical reaction.

In one exemplary implementation, there is a small gap between the anode tip and the dielectric to enable exposure to reactants and/or their associated solvents. Notably, the surface layer conduction model is directly exposed to reactants; the reactants slide along the dielectric surface until they are close enough to react. The reactants are not diffused through an ion conducting material (such as the diffusion-based models described in greater detail infra). Consequently, the Surico cell is not limited by the diffusion, porosity, and/or permeability of materials such as e.g., electrolytes, polyelectrolytes, ceramics, and/or any other ion conducting materials.

Layered Electrolyte-Based Fuel Cell Variant—

In one exemplary embodiment of the present disclosure, a junction bias cell ("JB cell") transfers ions to a reaction interface via diffusion through an electrolyte media (instead of surface layer conduction across a dielectric). The following discussion provides an overview of the structure, function, and operation of a junction bias cell (also referred to throughout as a "JB cell"). The JB cell apparatus is configured to: create reactant ions (e.g., fuel ions, oxidant ions, etc.) in isolation, transport the reactant ions to a bipolar junction interface, enable a chemical reaction, harvest the resulting electrical current, and eliminate the exhaust products.

Figure 10:
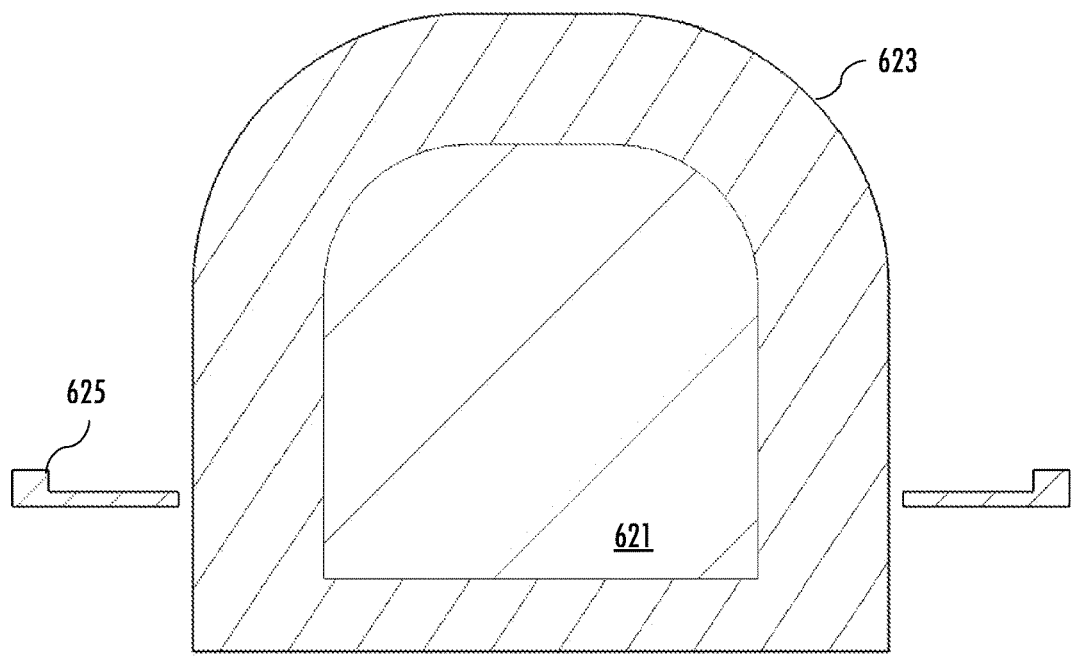
FIGS. 10-11 are cross-sectional and perspective views of the exemplary tip plate sub-assembly used within an exemplary Junction Bias (JB) cell, useful in conjunction with various embodiments described herein.
Figure 11:
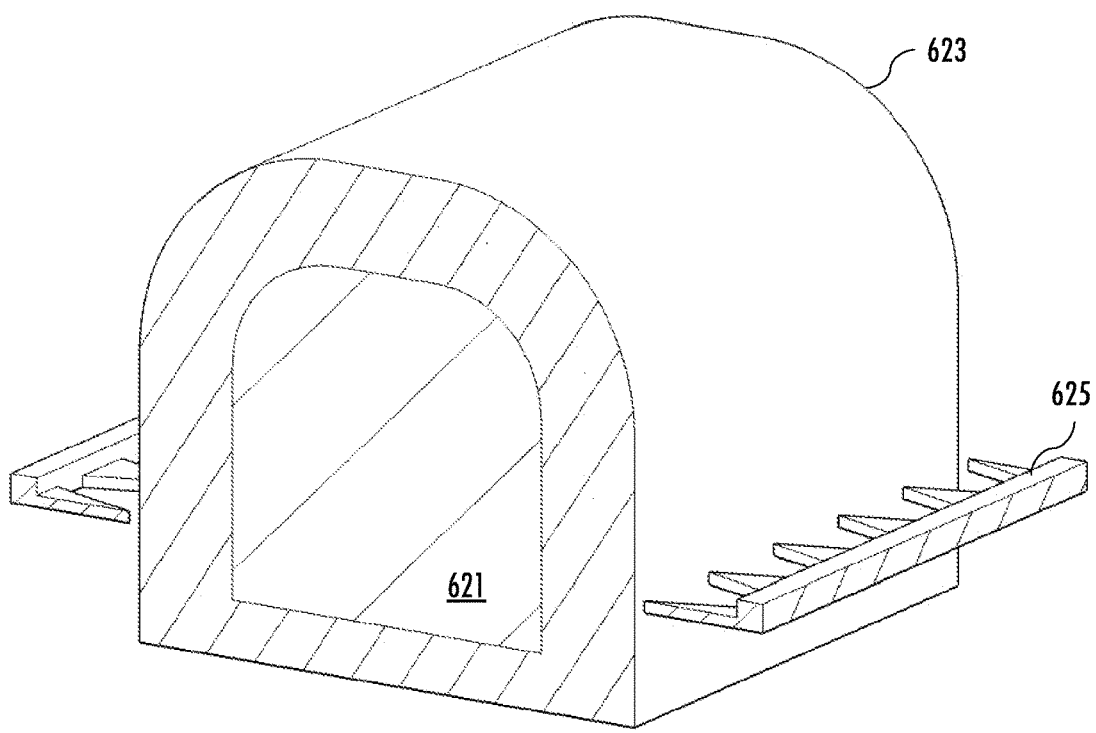

FIG. 10 is a cross-sectional view of an exemplary tip plate sub-assembly used within a JB cell. FIG. 11 provides a perspective view of the exemplary tip plate sub-assembly. As shown therein, the JB cell includes an electrode tip plate (621), an electrode fluid space (electrolyte) (623) and an electrode (625). In one embodiment of the invention, the electrode tip may be high aspect ratio and terminate in an atomically thin (atomic layer deposition) point. The illustrated tip plate sub-assembly includes a small gap between the electrode fluid space (623) and the electrode (625); however, the JB cell does not rely on surface layer conduction, thus the electrode can be in physical contact with the electrolyte. More directly, reactants and/or their associated solvents are diffused throughout the electrolyte (623) and may be ionized directly within the electrolyte (623).

Figure 12:
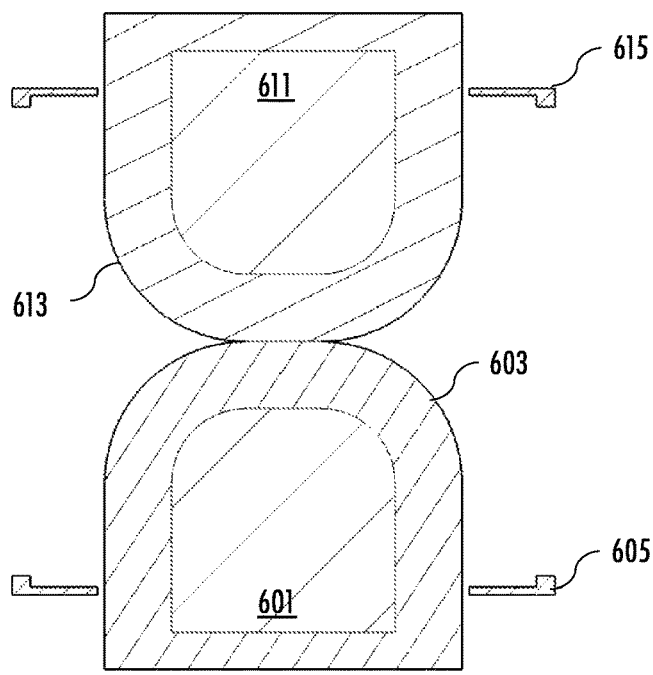
FIGS. 12-13 are cross-sectional and perspective views of the exemplary Junction Bias (JB) cell assembly, useful in conjunction with various embodiments described herein.
Figure 13:
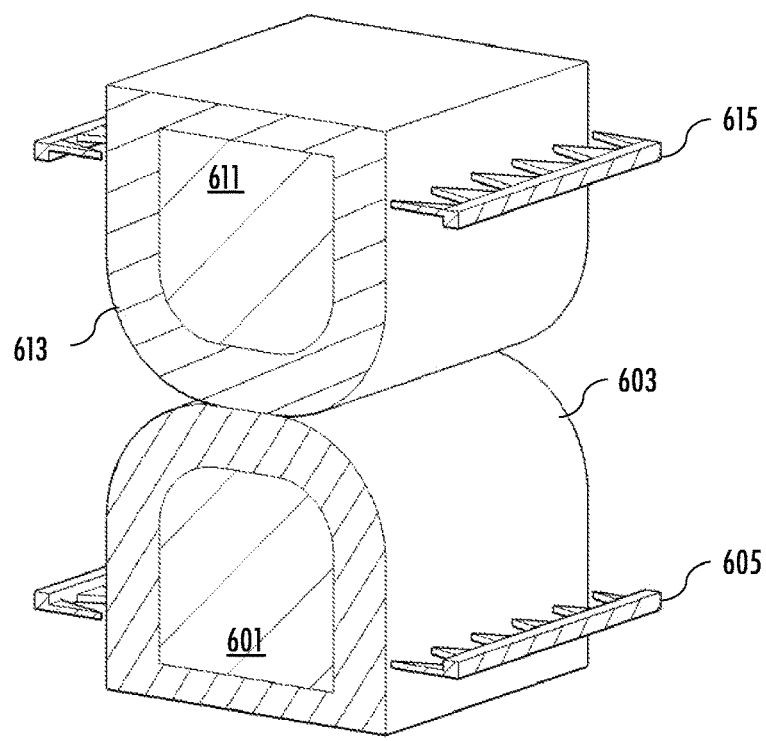

FIG. 12 is a cross-sectional view of the JB cell assembly. FIG. 13 provides a perspective view of the exemplary JB cell assembly. The JB cell assembly includes two (2) tip plate assemblies configured as a cathode array and an anode array. As shown therein, the cathode array is positioned (inverted) over an anode array. The exemplary cathode current collector electrically connects the cathode tips (615). The cathode tips face a catholyte (613). In one embodiment, the cathode tips (615) are positioned within nanometers of the catholyte (613). In another embodiment, the cathode tips (615) physically touch the catholyte (613). In one embodiment, the cathode tips may be atomically thin (possibly terminating to a single atom). The catholyte (613) encapsulates the cathode tip plate (611) and allows ions to freely diffuse throughout.

Similarly, the exemplary anode array includes the anode current collector which electrically connects the anode tips (605). The anode tips (605) face a solid anolyte (603). In one embodiment, the anode tips (605) are positioned within nanometers of the anolyte (603). In another embodiment, the anode tips (605) physically touch the anolyte (603). The anode tips are atomically thin (possibly terminating to a single atom). The anolyte (603) encapsulates the anode tip plate (6oi) and allows ions to freely diffuse throughout. Unlike the aforementioned surface layer ion conduction models which may be separated by a gap of a few Angstrom lengths, the anolyte (603) and catholyte (613) are in physical contact and create the bipolar junction interface at their points of physical contact.

Figure 14:
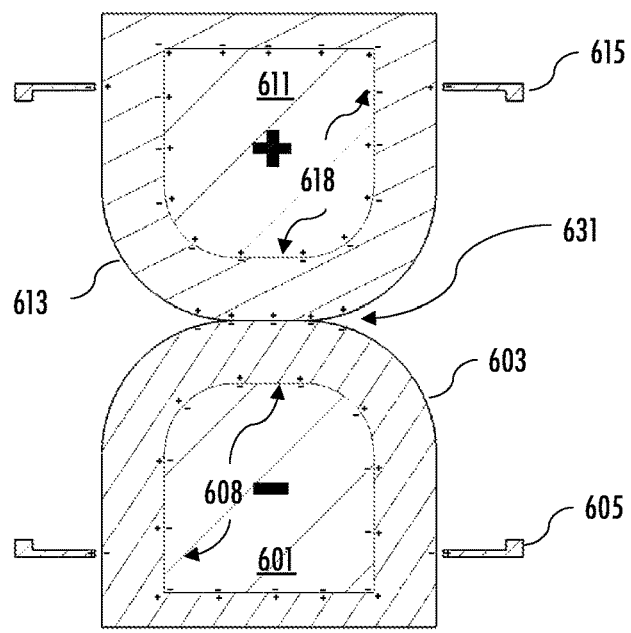
FIGS. 14-16 depict fuel cell-like operation for the exemplary Junction Bias (JB) cell, in accordance with the principles described herein.
Figure 15:
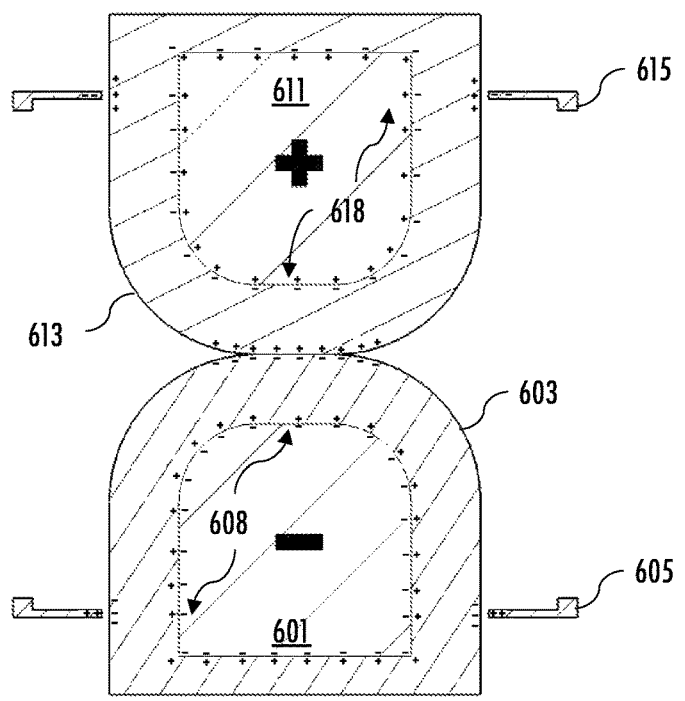
Figure 16:
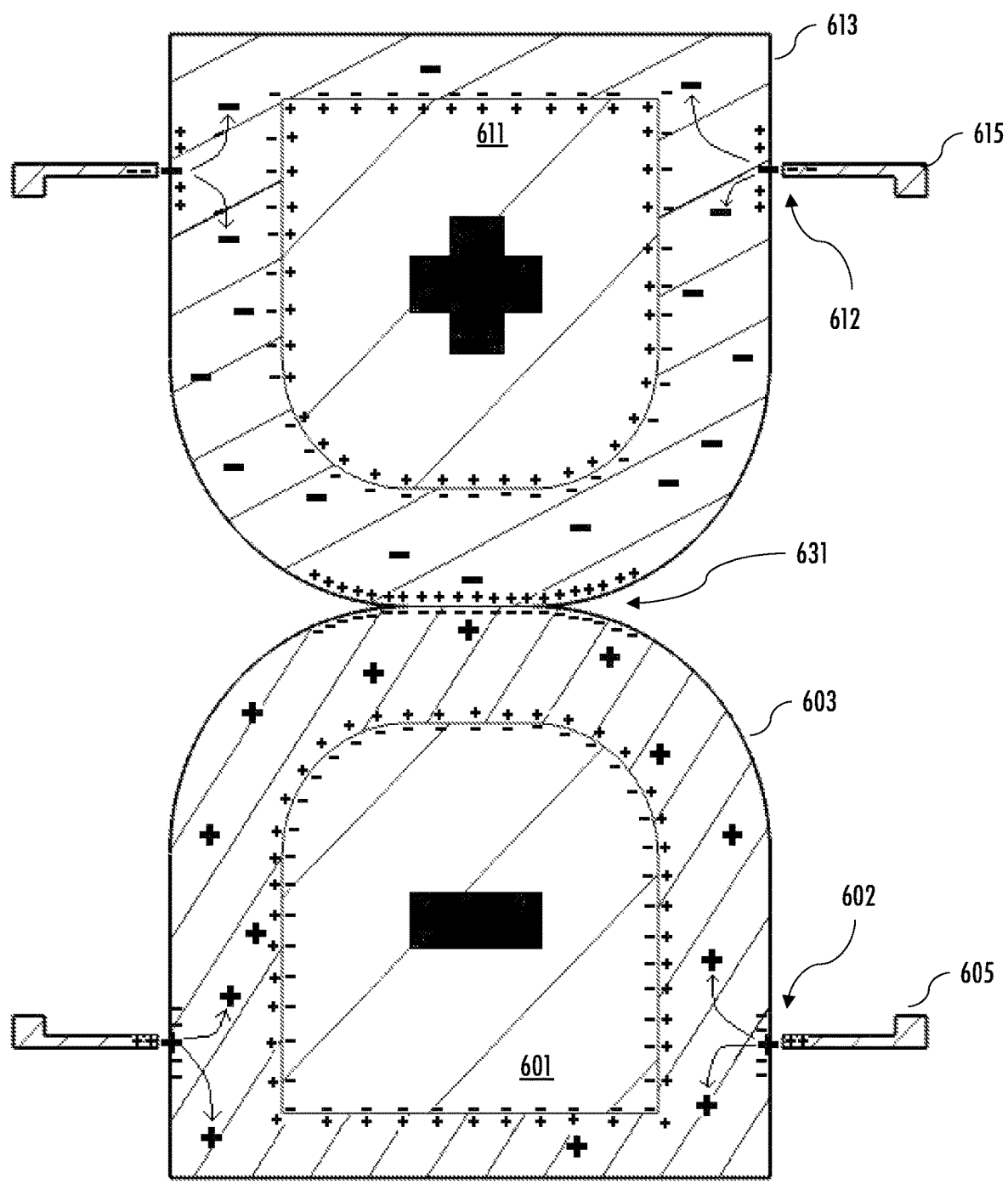

Referring now to FIGS. 14, 15, and 16, fuel cell-like operation for the exemplary JB cell is depicted sequentially. FIG. 14 shows a cathode tip plate charge "+", indicating an initial small positive voltage applied to the cathode tip plate (611). FIG. 14 also shows an anode tip plate charge "−", indicating an initial small negative voltage applied to the anode tip plate (601). The voltage applied to the tip plate induces the formation of a cathode tip plate double layer (618) and an anode tip plate double layer (608). The charge applied to the tip plates induce a reverse bias in the polyelectrolytes, such that ions form an ionic double layer at the touching interface (631) between the two polyelectrolytes. Under the "reverse bias" conditions, no ions will cross the interface and a voltage drop builds at the interface (creating an ion depletion region, similar to an electron depletion region). A small double layer (618) will form near the closest position of the cathode (615) to the catholyte space (613). A small double layer (608) will also form near the closest position of the anode (605) to the anolyte space (603). FIG. 15 illustrates the effects of applying larger charges to the exemplary JB cell; as shown therein, the charge density of the double layers and the ionic double layer have increased.

As shown in FIG. 16, the tip plates (611, 601) are charged sufficient to ionize the fuel and oxidants that have been diffused throughout the anolyte and catholytes. Specifically, as shown, the negative charge is pulled off the cathode (615) forming negative ions (601) illustrated with a large "−" minus sign (612). One exemplary oxidant to be reduced at the cathode is oxygen (forming the superoxide ion, or hydroxide ion). The voltage is also high enough to pull positive charge from the anode 605 forming positively charged fuel ions (602) illustrated with a large "+" sign. One exemplary reductant to be oxidized is hydrogen (forming the hydrogen ion). These oxidant (612) and fuel (602) ions can diffuse the short distance within their respective electrolytes, to meet at the bipolar junction interface (631) to react.

More directly, the fuel and oxidant ions are transported to the bipolar junction via their respective anolytes and catholytes. The bipolar junction is locally reverse biased. This creates a voltage step at the junction. The chemical potential stored in the reactant fuel and oxygen ions, allows these ions to overcome the voltage step. The fuel and oxygen ions react across the bipolar junction leading to the formation of products ($H_2O$, $CO_2$).

Advantageously, the exemplary JB cell decouples the reactants from directly powering the load. Notably, the redox reaction is allowed to proceed at a reaction interface rather than directly at the anode and cathode. Decoupled operation can be used to apply increased oxidizing and reducing strength to the reactants at the anode and cathode (since the reaction occurs elsewhere). For example, the aforementioned polyelectrolyte materials should provide an electrochemical stability window of 4 to 6 Volts (V) at the bipolar junction (based on their material compositions), but the load voltage and cell inefficiencies only consume ~1V of reaction potential (e.g., a function of the ionization efficiency). Consequently, an additional 3 to 5 electron Volts (eV) of redox potential is available to be directly applied to activate the reactants. In one such implementation, increased voltage can be applied at the anode and cathode tips to increase the electrochemical potential of the reactants. In some embodiments, the increased voltage can be combined with low-polar/non-polar solvents and/or highly saturated polyelectrolytes to encourage the adiabatic generation of activated reactants with very high electrochemical potential. High electrochemical potential may be particularly useful for certain classes of reactants (e.g., hydrocarbon type fuels, etc.) Additionally, since the electrolytes trap and diffuse the ionized reactants, the ionization may be performed at rates (and voltages) that do not substantially raise the temperature of the system (adiabatically). Adiabatic operation is highly desirable in industrial applications for a variety of reasons.

In certain JB cell implementations, the exhaust products are passively removed from the electrolyte (e.g., electrolytes that exclude water, etc.) In other implementations, the device is operated at a temperature that exceeds a boiling point of the exhaust products (e.g., $CO_2$, $H_2O$), but does not exceed the boiling point of the electrolyte. For example, the electrolyte may include e.g., dimethyl sulfoxide (DMSO), Sulfolane, or a similar polar solvent (characterized by boiling points ~200° F.-300° F.) and the JB cell can be kept at approximately ~110° F.

As a brief aside, most fuel cells are constrained to include specific set of materials and temperatures that permit the creation of fuel and oxidant ions. Conditions must exist that encourage a chemical equilibrium of neutral and ionized species of oxidant and fuel. In many cases, the chemical equilibrium between neutral and ionized species is difficult to achieve without expensive electrocatalysts (platinum), or by operating the fuel cell at high temperatures. Unlike prior art fuel cell technologies that require scarce and expensive catalyst metals to operate, the foregoing Surico and JB cells ionize the reactants separately and transport the activated reactants to a reaction interface (e.g., a bipolar junction); this obviates the requirements for both catalysts and/or high temperature operation.

As a related tangent, the exemplary apparatus described herein can operate at room temperature. Room temperature operation sidesteps many problems in the prior art. For example, some fuel cells rely on high temperature (800° C.) operation to enable ion conduction. High temperature operation requires lengthy startup periods and expensive, thermally resistant materials to insulate and support the fuel cell. Notably, the anode and cathode material need to thermally expand at a similar rate as the electrolyte, or they will fracture and separate with thermal cycling. Also, high temperatures and corrosive electrolytes may cause accelerated corrosion of the fuel cell components. In contrast, the exemplary cell can ionize fuel and oxidant reactants at room temperature; once activated, the reactants have sufficient potential to react (operation need only exceed 100° C. to vent steam exhaust).

Moreover, the exemplary cell does not rely on complex materials, fuels, oxidants, and/or chemistries. Unlike other fuel cells, the exemplary cell does not rely on exotic chemistries to eke out small gains in efficiency. As a result, the exemplary cell does not require expensive fuels (e.g., hydrogen). Reactants do not need to be pre-treated to prevent contaminant poisoning. Similarly, the electrolyte/polyelectrolytes identified supra are already widely used for e.g., bipolar membrane electrodialysis and do not require special handling (e.g., to avoid $CO_2$ poisoning and/or maintain moisture content.)

Generalized Apparatus and Methods

Figure 17:
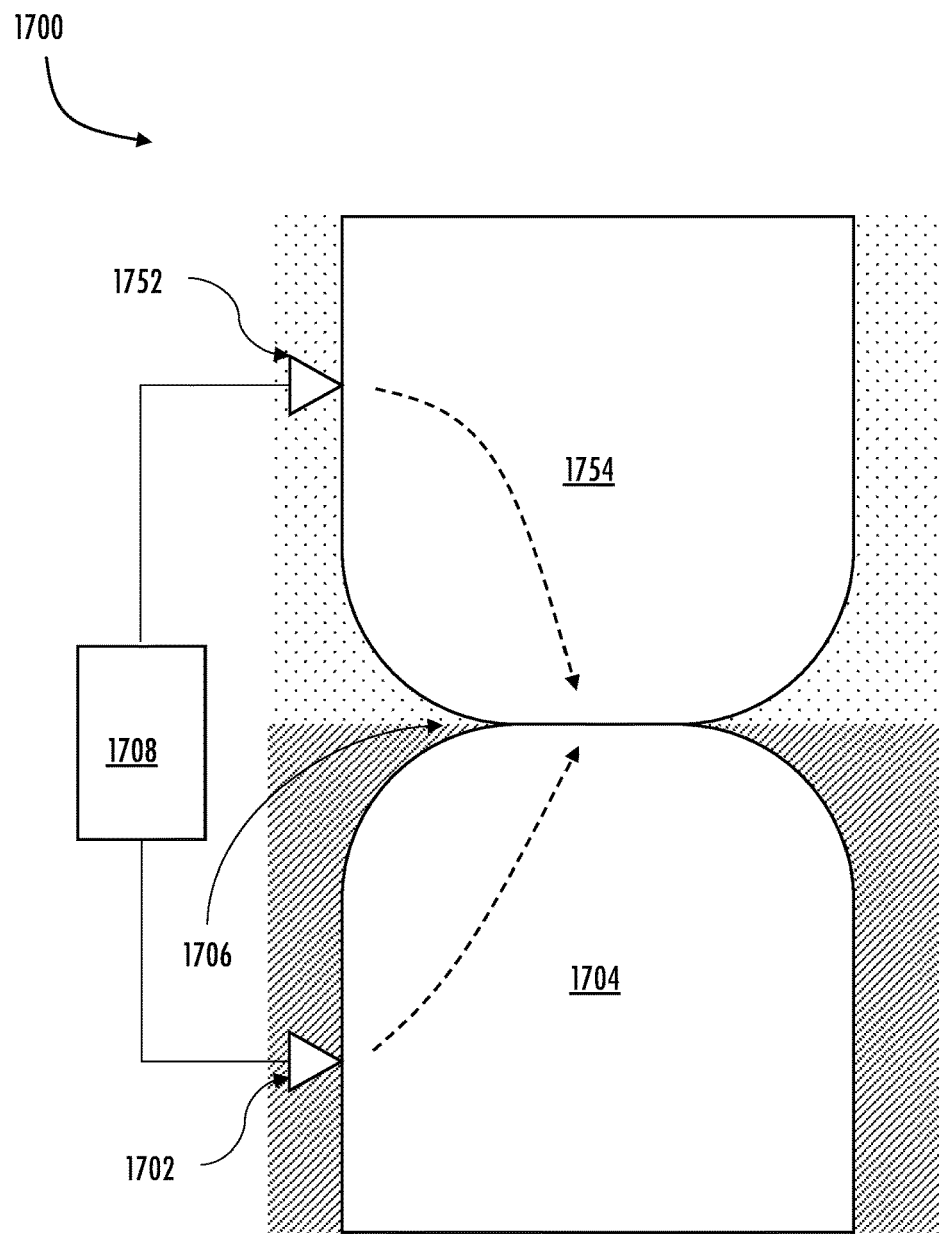
FIG. 17 is a logical block diagram of a generalized apparatus configured to decouple reactant activation and reaction completion, in accordance with the principles described herein.

FIG. 17 is a logical block diagram of a generalized apparatus 1700 configured to decouple reactant activation and reaction completion.

In one embodiment, the apparatus includes a first activation component (1702) and a second activation component (1752). In one exemplary embodiment, the first and second activation components (1702, 1752) are passive electrodes and corresponding tip plates. In other embodiments, the first and second activation components (1702, 1752) may be actively charged electrodes. In one specific implementation, the first and second activation components are configured to ionize reactants when brought proximate to an electrical field. For instance, a first electrode (1702) may be an anode that passively releases positive charge when placed proximate to a negatively charged anode tip plate; exposed reductants may be ionized into activated reductant ions. Similarly, the second electrode (1752) may be a cathode that passively releases negative charge when placed proximate to a positively charged cathode tip plate; exposed oxidants may be ionized into activated oxidant ions.

As a brief aside, the "activation energy" of a chemical reaction refers to the minimum quantity of energy required to activate the reactants. As used herein, the term "activated reactants" refer to reactant species which are no longer constrained by the activation barrier, and hence may immediately react to form products (exhaust). Activation energy may be affected by a variety of different factors e.g., temperature, chemical environment, electrical potential, and/or the presence of catalysts (a substance that lowers the activation energy without being consumed by the reaction.)

In one exemplary variant, portions of the activation components may be encapsulated within transport media (1704, 1754). As but one such example, the anode tip plate and/or cathode tip plate may be partially, or entirely, encapsulated within dielectrics and/or electrolyte materials. Such implementations facilitate the collection of activated reactants by the transport media (described in greater detail hereinafter). In other variations, the anode tip plate and/or cathode tip plate may be directly exposed to the reactants, or otherwise incorporated within the anode and/or cathode structures.

As used herein, the term "dielectric" refers to a material that does not permit charge carriers to flow, yet which may be polarized to permit the electrical field to pass. Dielectric materials are characterized by little to no electrical conductivity while still having high electrical permittivity. Materials with high dielectric properties (also referred to as high-k dielectrics) may be modeled as having near ideal capacitance; low dielectric materials (also referred to as low-k dielectrics) may be modeled as having capacitance with parasitic aspects (resistance and/or inductance).

In one embodiment, reactants are exposed to the activation components (1702, 1752). As but one such example, the reactants may be physically exposed to a small gap (only a few Angstrom lengths) between the activation component and transport media (see e.g., *Surface Layer Ion Conduction Variant (Surico)* discussed supra.) In other embodiments, reactants may be indirectly activated via nearby electromagnetic fields ("field activation"); for example, reactants may be diffused throughout an electrolyte media, the media may be exposed electrical fields thereby allowing the diffused reactants to be activated (see e.g., *Layered Electrolyte-based Fuel Cell Variant* discussed supra.)

While present disclosure is presented in the context of fuel and oxidant ions, artisans of ordinary skill in the related arts will readily appreciate that virtually any reduction-oxidation ("redox") reaction may be substituted with equal success, the foregoing being purely illustrative. Redox reactions broadly encompass chemical reactions where the oxidation states of atoms are changed (electrons are transferred between chemical species). The reducing agent undergoes oxidation (loses electrons) while the oxidizing agent undergoes reduction (gains electrons). Redox reactions are not limited to fuel nor oxygen.

Additionally, while the foregoing discussion is presented in the context of ionization, virtually any technique for activating reactants may be substituted with equal success. Other forms of activation may include e.g., the addition of electrical energy, chemical energy, mechanical energy, kinetic energy, thermal energy, and/or any other form of potential energy.

Figure 18A:
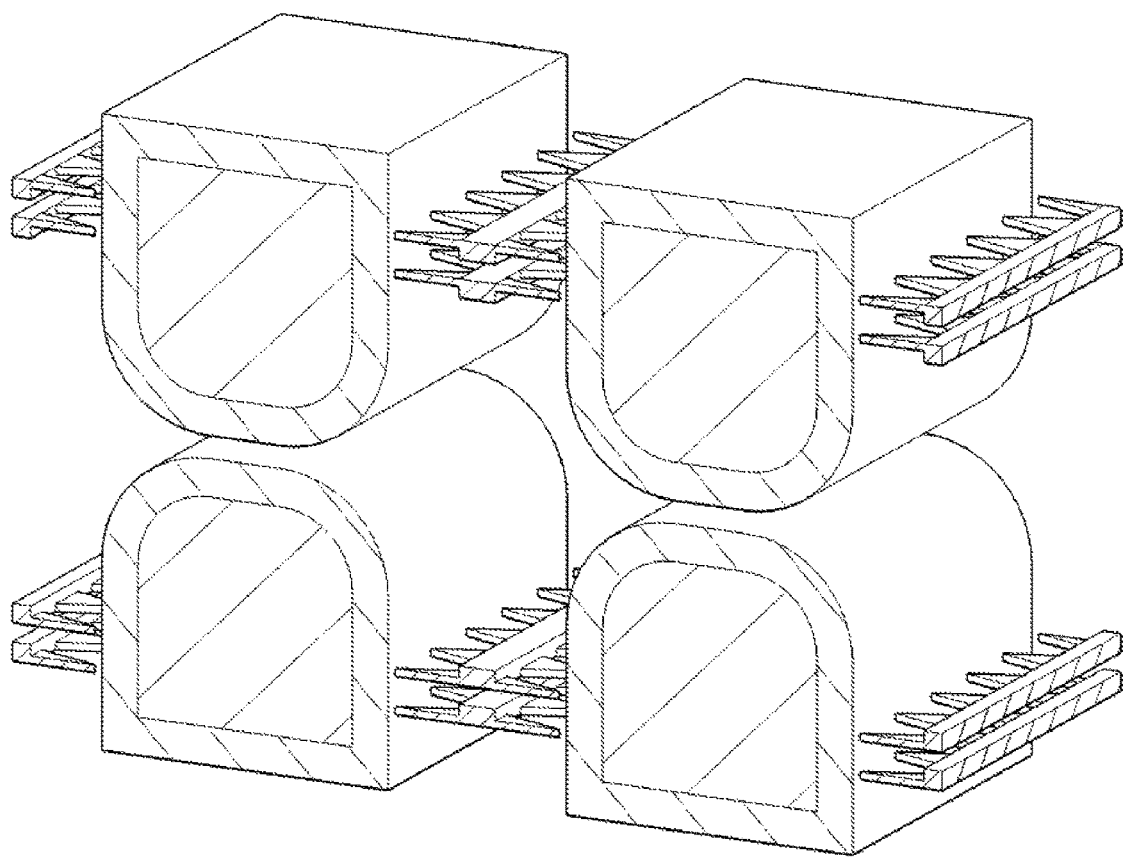
FIGS. 18A-18B depict an exemplary Surface Layer Ion Conduction (Surico) cell implementation and an exemplary Junction Bias (JB) cell implementation that include multiple instances of anode and cathode layers, useful in conjunction with various embodiments described herein.
Figure 18B:
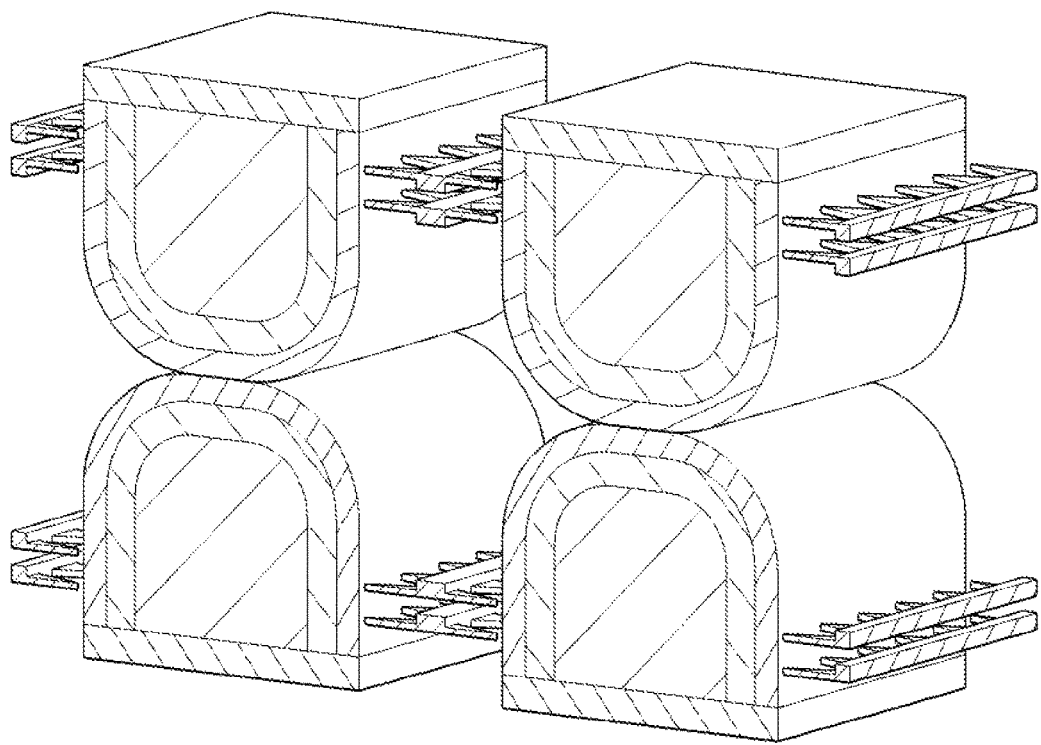

In some implementations, the activation components may be physically multiplied and/or arranged to increase or decrease the amount of reactant that is activated. In one specific implementation, electrodes may be arranged as an array of electrode points. FIG. 18A illustrates one exemplary Surface Layer Ion Conduction (Surico) cell implementation that includes multiple instances of anode and cathode layers. Similarly, FIG. 18B illustrates one exemplary junction bias (JB) cell implementation that shows multiples cathodes and multiple anodes. While two (2) layers are depicted, the geometry may be stretched to accommodate any number of cathode and/or anode layers. Additionally, artisans of ordinary skill in the related arts will readily appreciate that the illustrated geometries may be extended in the horizontal plane to increase surface area and/or duplicated in the vertical plane to include more anode and cathode layers.

Figure 19A:
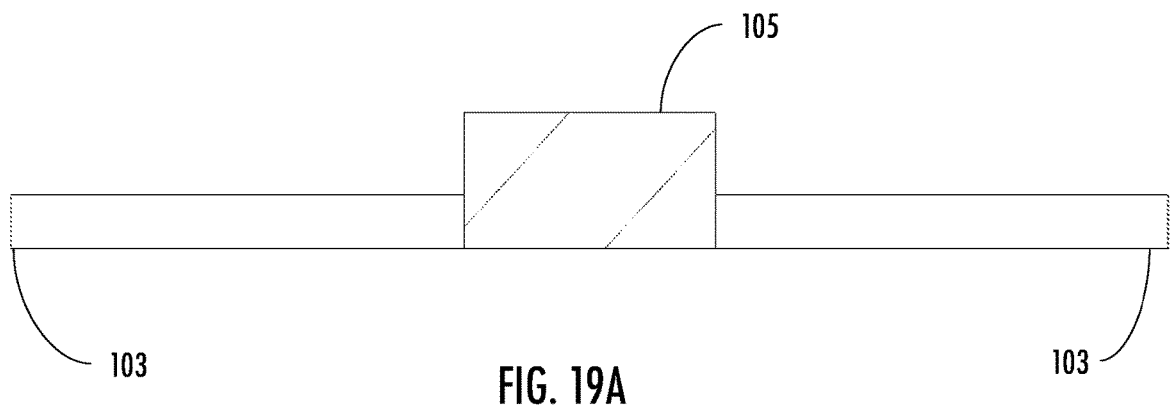
FIGS. 19A-19B show cross-sectional and perspective views of an exemplary electrode current collector and electrode tips, useful in conjunction with various embodiments described herein.
Figure 19B:
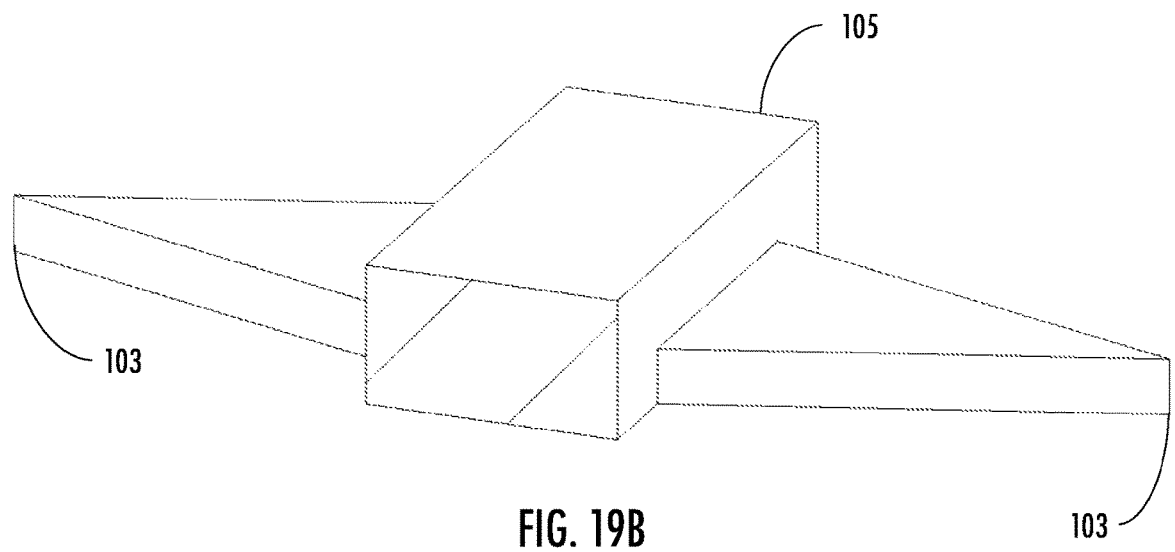

Referring now to FIGS. 19A and 19B show cross-sectional and perspective views of an exemplary electrode current collector (105) and electrode tips (103). In one embodiment, the electrode is symmetrically fashioned with two (2) electrode tips; other implementations may be single tipped, multi-tipped, and/or asymmetric.

Notably, electrostatic field distribution is a function of the electrode's physical structure. The electrostatic field at the tip of a pointed conductor is concentrated because charge is pushed to the tip. The disproportionate distribution of charge is also focused over a very small area resulting in a large surface density of charge (and commensurately large electrical field). Very sharp tips may greatly improve the ionization functionality of the electrode, thus in some variants the electrodes are "sharpened" to atomically thin points (possibly terminating to a single atom).

Sharp electrodes may be preferable for ionization properties, however different implementations may consider other factors in electrode design. For example, certain use cases may be subject to physical and/or chemical wear (e.g., breakage, corrosion, etc.) In such variants, electrodes may trade off ionization potential for more resilient and/or robust structures. In another such example, different materials and/or manufacturing techniques may impose certain limitations on physical construction. While atomic layer deposition (commonly used in semiconductor lithography) can print down to an atomic reticule, other manufacturing techniques may only provide larger granularity detail. More generally, artisans of ordinary skill in the related arts given the contents of the present disclosure will readily appreciate that other electrode structures may be substituted with equal success.

Figure 20A:
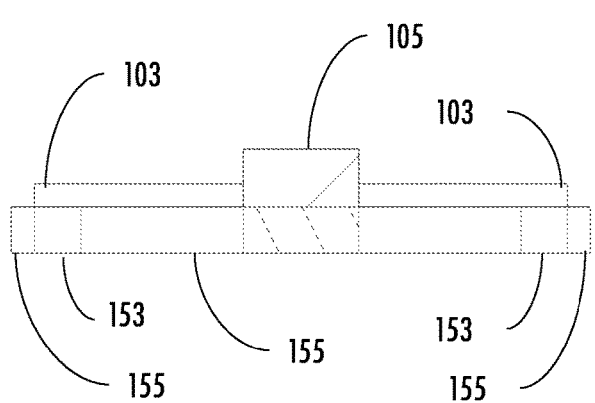
FIGS. 20A-20E depict various cutout views of an electrode that is encapsulated within dielectrics, useful in conjunction with various embodiments described herein.
Figure 20B:
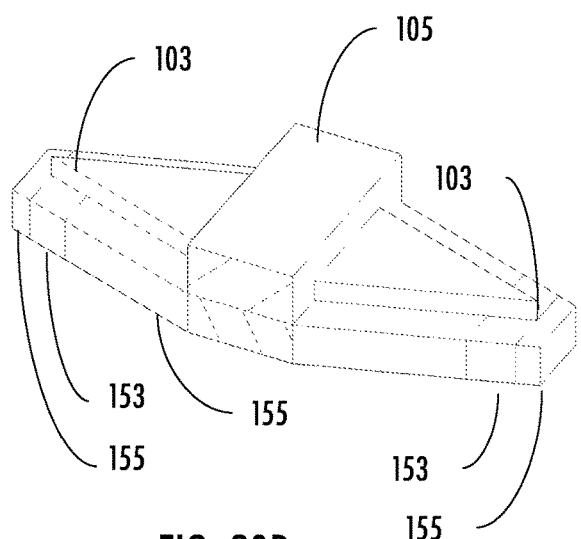
Figure 20C:
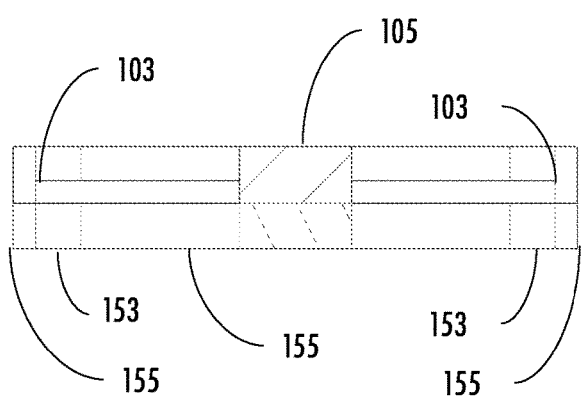
Figure 20D:
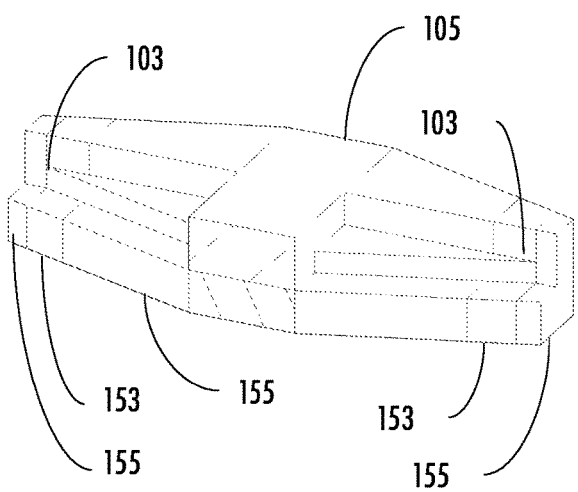
Figure 20E:
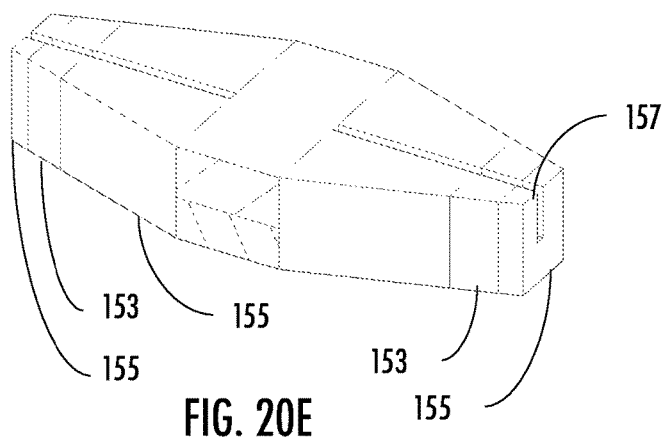

FIGS. 20A-20E various cutout views of an electrode that is encapsulated within dielectrics. As shown in FIGS. 20A and 20B, the electrode rests on a substrate that comprises both a low k dielectric (153) and a high k dielectric (155). The tip of the electrode (103) contacts the low k dielectric (153) which is characterized by a substantially higher electrical permittivity than the high k dielectric (155). In this manner, the electrical field induced by the encapsulated electrode can be further localized (and strengthened) at the tip point. FIGS. 20C and 20D show a partial cutout of the encapsulated electrode. FIG. 20E shows a completely encapsulated electrode tip; reactants are exposed to the electrode by means of narrow grooves (157).

Figure 21A:
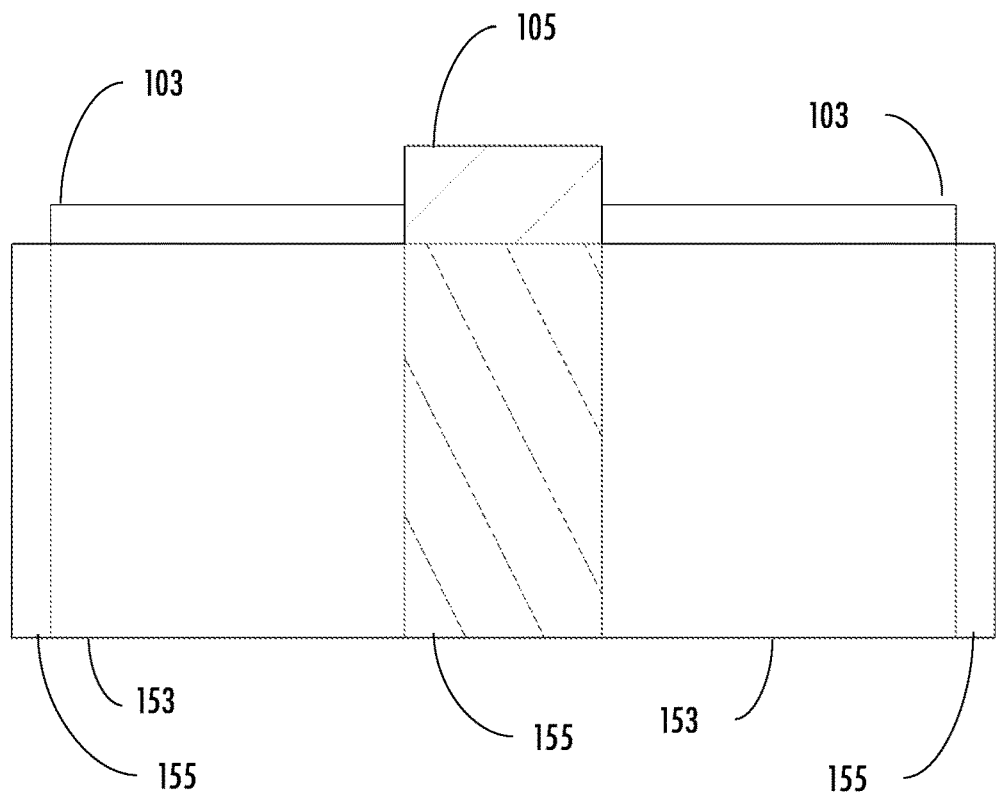
FIGS. 21A-21B depict cross-sectional and perspective views of an exemplary electrode tip array that uses vertical dielectric reactant flow channels to activate reactant, useful in conjunction with various embodiments described herein.
Figure 21B:
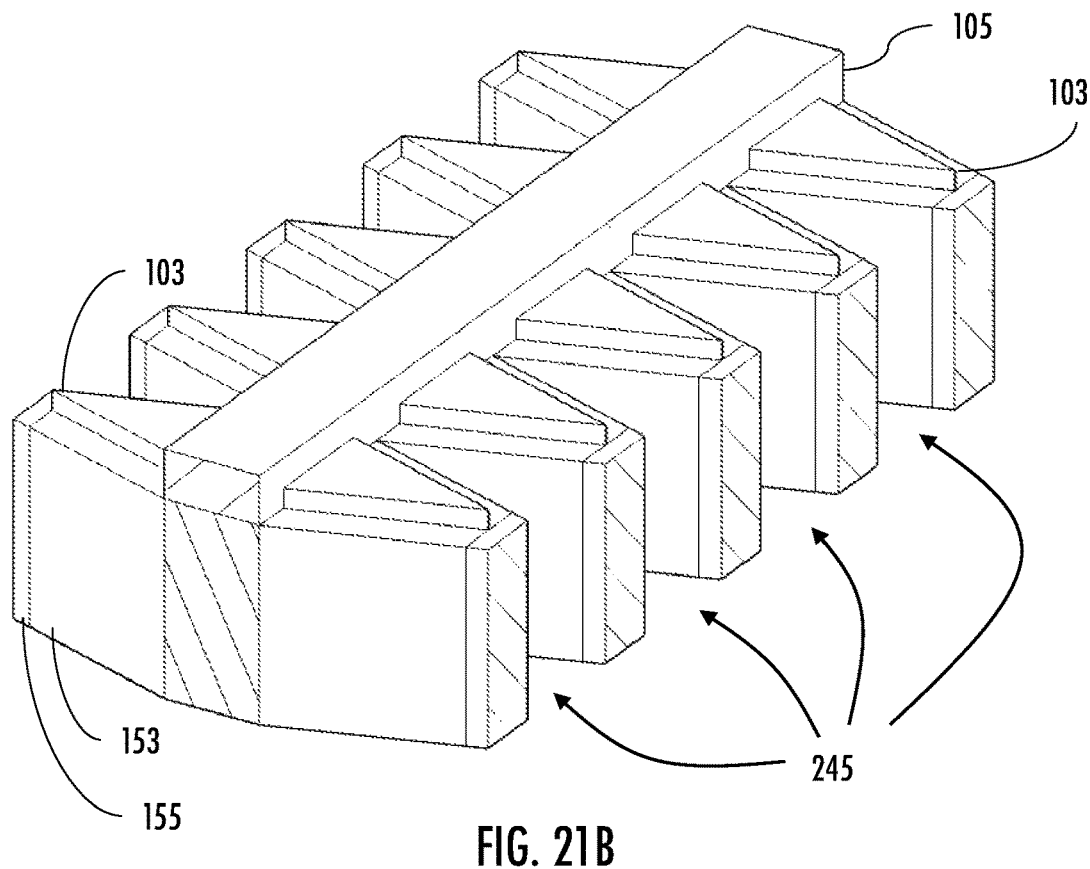

While the foregoing electrode design uses narrow grooves to activate reactants in high intensity electrical fields. Alternative implementations may activate reactants via flow channels (245). FIGS. 21A and 21B show cross-sectional and perspective views of an alternative electrode tip array that uses vertical dielectric reactant flow channels (245) for reactant flow.

Notably, the electrodes are exposed in the illustrative embodiment, however other variants may encapsulate the electrode in either high or low k dielectrics.

Figure 22A:
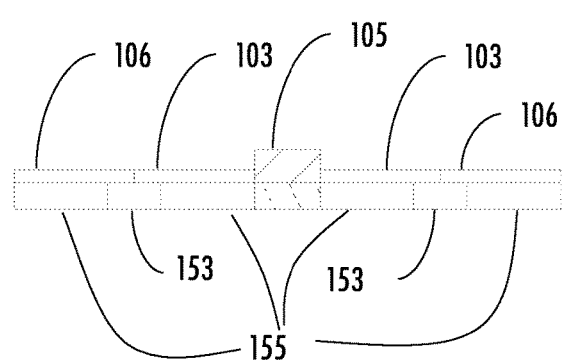
FIGS. 22A-22D depict multiple views of an electrode that is encapsulated within dielectrics, useful in conjunction with various embodiments described herein.
Figure 22B:
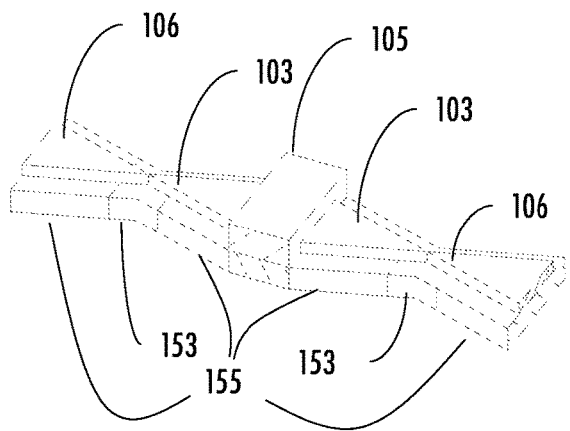
Figure 22C:
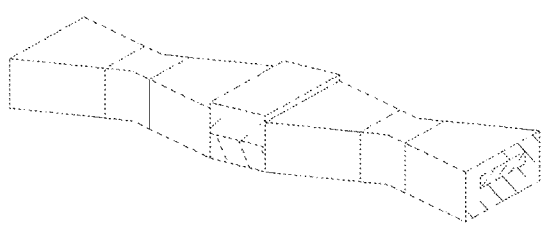
Figure 22D:
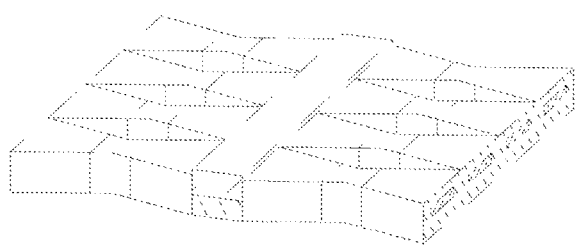

As previously alluded to, reactants may be indirectly activated via nearby electromagnetic fields; for example, reactants may be activated in an electrolyte/polyelectrolyte (see e.g., *Layered Electrolyte-based Fuel Cell Variant* discussed supra.) Referring now to FIGS. 22A-22D, one exemplary embodiment of an electrode geometry for connecting to an electrolyte/polyelectrolyte is shown. FIGS. 22A and 22B show a cross-sectional and perspective cutout views of an electrode that is encapsulated within dielectrics. As shown therein, a current collector (105) is connected to electrodes (103). The electrodes (103) are in contact with electrolyte/polyelectrolyte layers (106). In one implementation, the electrolyte/polyelectrolyte (106) may be shaped using a similar high aspect ratio sharp point. As previously noted, other tip geometries may be substituted with equal success. In some variants, the junction between the electrode and electrolyte layers (106) may be linked via low k dielectric (153). In one such variant, the electrical field may be further focused and intensified at the contact point by using high k dielectric (155). FIGS. 22D-22E present perspective views of a single fully encapsulated electrode to electrolyte/polyelectrolyte assembly, and an array of such assemblies.

The foregoing discussions have presented many different electrode tip implementations. The aforementioned electrode implementations described supra are purely illustrative; other geometries, materials, configurations, and/or arrangements may be substituted with equal success, by artisans of ordinary skill, given the contents of the present disclosure.

Referring back to FIG. 17, in one embodiment, the apparatus includes a first transport component 1704 and a second transport component 1754. In one exemplary embodiment, the first transport component 1704 collects first activated reactants from the first activation component 1702 and transports the first activated reactant to a reaction interface 1706. Similarly, a second transport component 1754 collects second activated reactants from the second activation component 1752 and transports the second activated reactant to the reaction interface 1706. Notably, the transport component decouples the activation of reactants from their subsequent reaction completion. As a practical matter, decoupling activation from reaction allows the two processes (activation and reaction completion) to be independently performed; e.g., activation can be performed over a much larger surface area (e.g., many electrode tips), to feed a much smaller reaction surface, or vice versa. This is fundamentally different than e.g., existing anode/cathode reactions which activate components and react components at the same surface (resulting in the aforementioned electrical double layer bottleneck).

In one exemplary embodiment, activated reactants are transported via surface layer ion conduction along a dielectric transport media (see e.g., *Surface Layer Ion Conduction Variant (Surico)* discussed supra.) More generally, any material that is suitable to reduce and/or prevent charge transport (electron transfer) into or out of the electrode tip plates may be substituted with equal success. Examples of materials suitable for this purpose may include, without limitation, dielectrics with a higher (high-k) or lower dielectric (low-k) constant than silicon dioxide, as well as complex distributions of those dielectrics. In some implementations, electrolysis reduction prevention layers may include ion exchange resins, ion conduction membranes, AEMs, CEMS, polyampholytes, zwitterions, zwitterionic fluids, polyelectrolytes, ionic fluids, and/or polymeric ionic fluids. In other implementations, electrolysis reduction prevention layers may include solids such as fast ion conductors. Examples of solid electrolysis reduction layers may include high temperature oxygen ion conductors and hydrogen ion conductors. Other materials may include porous solid frameworks, for example porous metal organic frameworks. Electrolysis reduction/prevention layers may be used in either or both of the anode and cathode tip plates.

In one exemplary embodiment, reactants may be transported via diffusion through an ion conduction media (see e.g., *Layered Electrolyte-based Fuel Cell Variant* discussed supra.) As used herein, the term "electrolyte" refers to a media that enables ion transport (ion conduction); electrolytes are typically a liquid or a gel but may also refer to "solid ion conductors" and/or "fast ion conductors" (materials that are commonly used in the solid oxide fuel cell arts). As described in greater detail herein, various embodiments of the present disclosure may further isolate and distinguish between electrolytes that are used for the anode and cathode. As used herein, the term "anolyte" refers to the ion conducting media associated with the anode, the term "catholyte" refers to the ion conducting media associated with the cathode.

In one such variant, reactant to be reduced (e.g., an oxidizing agent) is transported via a catholyte. In another such variant, a reactant to be oxidized (e.g., a reducing agent) is transported via an anolyte. The anolyte and/or catholyte may include any media that does not impede the creation and movement of ions. Such media may be plasma, vapor, liquid or solid. Examples of such media may include, but are not limited to, air, polar and non-polar solvents, and/or solids with sufficient porosity to allow the conduction of ions. Solid, high temperature ion conductors, for example oxygen ion conductors and hydrogen ion conductors may be included. Other media may include fast ion conductors and/or other solid electrolytes. Other material that may inhabit the anolyte fluid space include materials such as liquid or polymer electrolytes, ion exchange resins, ion conductive membranes, polyampholytes, zwitterions, zwitterionic fluids, polyelectrolytes, ionic fluids and/or polymeric ionic fluids. The anolyte may also include phase transfer catalysts, crown ethers and/or other chelating substances. Other media materials may include porous solid frameworks, for example porous metal organic frameworks. During operation, holes may be "pulled" or "injected" into the anolyte material. Hence new materials that normally do not conduct fuel ions (or other reductant ions), may become ionically conductive during operation, and these materials may also be used in the anolyte.

As used herein, the terms "ionomer" or "polyelectrolyte" refer to an ion exchange membrane. Within the catholyte space, the polyelectrolyte membrane may also be referred to as an "anion exchange membrane" (AEM). Within the anolyte space, the polyelectrolyte membrane may also be referred to as a "cation exchange membrane" (CEM).

Figure 23:
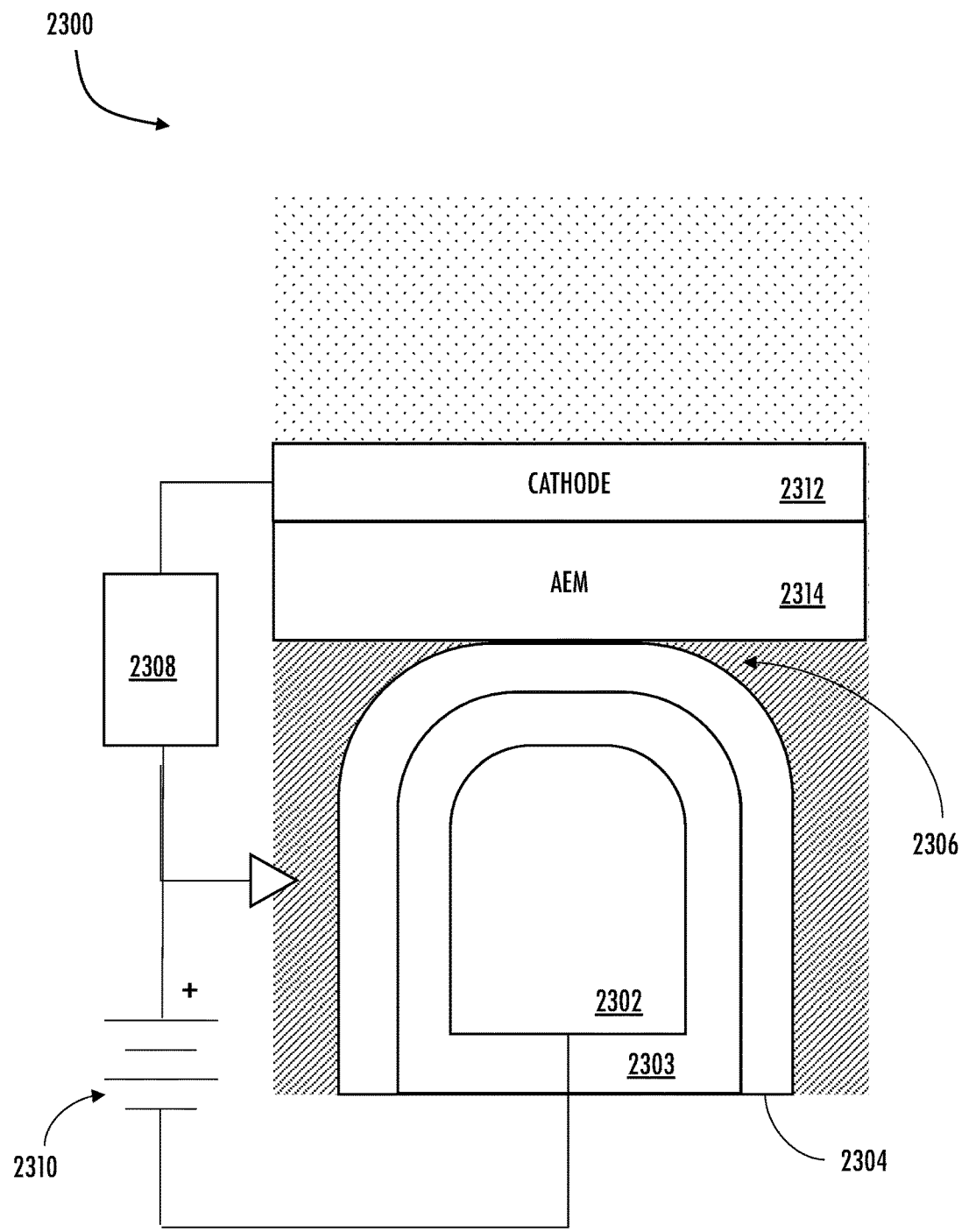
FIG. 23 is a graphical representation of an asymmetric geometry using a non-uniform construction, useful in conjunction with various embodiments described herein.

While the foregoing examples are presented in the context of transport media that is symmetric and/or constructed of uniform materials, the various principles described herein may be broadly applied to asymmetric and/or non-uniform constructions. Notably, many fuel cell chemistries are limited by one reactant, thus some implementations may make trade-offs to e.g., reduce device complexity and/or manufacturing costs. FIG. 23 provides one such asymmetric geometry 2300 using a non-uniform construction. As shown therein, the anode array (comprising an anode tip plate 2302, electrolysis reduction/prevention layer 2303, and catholyte media 2304) is connected to an anolyte media 2314 and a simple cathode 2312 that is exposed to the air (an "air cathode"). In the illustrative example, oxidant ions are not the limiting reactant, thus the anolyte media 2314 and air cathode 2312 construction can be manufactured with substantial tolerances (and reduced cost). For instance, the anion exchange membrane (AEM) 2312 and air cathode (e.g., a porous foil cathode) may be constructed in large sheets and layered over the anode array.

During operation, the anode tip plate 2302 may be charged via a dedicated power supply (notably, the air cathode 2312 is a passive device and does not required external charge). The resulting formation of the reaction interface 2306 and powering of the load 2308 operates as previously described. While the foregoing structure is presented in the context of an anode array, cathode array variants may be substituted with equal success (e.g., an anode in direct contact with a cathode exchange membrane (CEM), etc.)

More generally, artisans of ordinary skill in the related arts, given the contents of the present disclosure will readily appreciate that a variety of design modifications may be substituted with equal success. For example, different materials and/or combinations of materials may be used. Other implementations may further thicken, thin, or incorporate different transport materials (e.g., dielectrics and/or other electrolysis reduction/prevention materials, electrolytes/polyelectrolytes and/or other ion conduction media, etc.) Additionally, the transport media geometries may be extended in the horizontal plane to increase surface area and/or stretched in the vertical plane to include more transport media. More generally, artisans of ordinary skill in the related arts will appreciate that the geometries described herein may be adapted to a variety of different form factors and/or purposes, the foregoing being purely illustrative.

Figure 24:
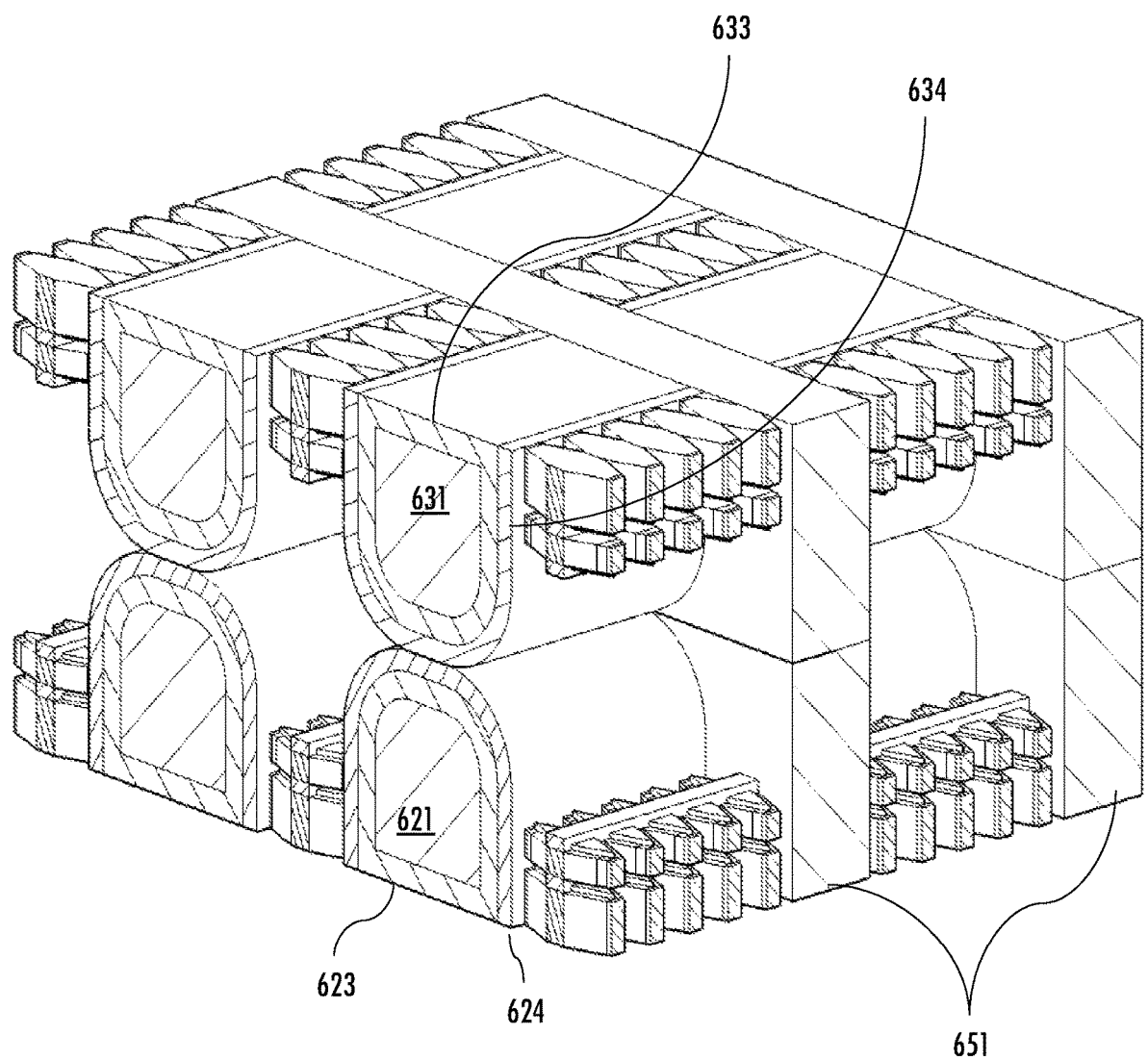
FIG. 24 depicts a perspective view of one exemplary JB cell implementation, useful in conjunction with various embodiments described herein.

FIG. 24 depicts a perspective view of one exemplary JB cell implementation that includes an anode layer and a cathode layer. As shown therein, the anode layer includes anode tip plates (621), electrolysis reduction/prevention layer (623) and anolyte (624). Similarly, the cathode layer includes cathode tip plates (631), electrolysis reduction/prevention layer (633) and catholyte layers (634). The layers may additionally include dielectric walls (651) to provide rigidity to e.g., maintain a uniform reaction interface contact. The layers may also include multiple anode and/or cathode arrays so as to further improve efficiency.

The electrolysis reduction/prevention layers isolate the tip plates from their respective anolyte/catholytes. The electrode tip plate electrolysis reduction/prevention layer may include any media that reduces or prevents charge transport into or out of the electrode tip plates. This includes low and high k dielectric as well as complex distributions of those dielectrics. It may include ion exchange resins, ion conductive membranes, AEMs, CEMS, polyampholytes, zwitterions, zwitterionic fluids, polyelectrolytes, ionic fluids, and/or polymeric ionic fluids. It may include solids such as fast ion conductors: examples include high temperature oxygen ion conductors and hydrogen ion conductors. Other materials may include porous solid frameworks, for example porous metal organic frameworks. This description of electrolysis reduction/prevention layer covers both the anode and cathode tip plate electrolysis reduction/prevention layers. The electrolysis reduction/prevention layers may also include a distribution of materials that increase or reduce the concentration of electric field lines in a specific portion of the device.

Additionally, as previously noted, some fuel cell technologies must keep catalysts at very high temperatures; for example, yttria stabilized zirconia can remove or greatly reduce the activation barrier for hydrocarbons when used at high temperatures (+800° F.). While the exemplary apparatus certainly could operate at such temperatures, various embodiments of the present disclosure may enable use of these materials at much lower temperature, possibly even room temperature for thin layers of material. Additionally, a much wider range of candidate materials may be used due to the forgiving nature of the exemplary operation.

More generally, fuel cell research has made significant advances in material science and/or manufacturing. Due to the various limitations of existing fuel cell technologies (high temperature, expensive electrocatalysts, etc.), a variety of different materials have been researched and/or discarded due to practical considerations. However, the aforementioned cells are a substantial departure from existing fuel cell designs. Since the components are used differently in the exemplary cell, practical considerations which may have precluded materials from use in traditional fuel cell designs may no longer be a barrier.

In some embodiments, solid ion conductors may provide a much larger electrochemical stability window at the bipolar junction reaction interface. Thus, constructing one or both of the catholyte and/or anolyte from a solid ion conductor material may enable even greater oxidizing and reducing strength to be applied to the reactants (e.g., hydrocarbon type fuels). In one specific embodiment, the catholyte space of the JB cell may use a solid oxide fast ion conductor such as yttria stabilized zirconia. In one specific embodiment, the anolyte space may be composed of a fast hydrogen ion conductor. During operation, negative oxygen ions are injected into the yttria stabilized zirconia, and positive hydrogen ions are injected into the hydrogen ion conductor. The direct injection of ions may also permit these solid electrolytes to conduct at lower temperatures. Other examples of suitable solid ion conductors may include without limitation: ceramics, solid acids (e.g., Nafion), composite media with catalytic metals and/or catalytic metal oxides.

As but another such example, the generation of ions at the anolyte/catholyte adjacent to the electrode tips maybe assisted by known catalysts. In one embodiment, platinum, rhodium, and other platinum group metals may be used at the electrode tips. More generally however, catalytic materials may include electrocatalysts, and oxidation catalysts. Examples of such catalysts include without limitation: catalytic solid acids/solid super acids, catalytic dispersed metals (e.g., nickel), catalytic dispersed metal oxides (e.g., nickel manganese oxide), and other reagents such as e.g., Fenton's reagent and superoxide/hydroperoxyl couples.

More generally, the any combination of materials that satisfy the aforementioned functionalities may be substituted with equal success. These functionalities include e.g., conduction (e.g., ionic conductors, mixed ionic/electronic conductors, etc.), diffusion or surface migration of reactants (which may be in the form of ions, radicals, and/or holes), immunity/resistance to the reactants, and suitability to enable the formation of an electrical double layer or a very narrow voltage gap at the reaction interface.

Referring back to FIG. 17, the apparatus 1700 includes a reaction interface 1706. In one exemplary embodiment, the reaction interface comprises a narrow gap (a few Angstroms in width) between two transport media (see e.g., *Surface Layer Ion Conduction Variant (Surico)* discussed supra.) In another exemplary embodiment, the reaction interface comprises a bipolar junction created by an anolyte that is in physical contact with a catholyte (see e.g., *Layered Electrolyte-based Fuel Cell Variant* discussed supra.) Still other embodiments may utilize a bipolar membrane, ion conduction material, or other reaction interface that enables activated reactants to meet and react.

While the foregoing examples are depicted in the context of a binary chemical reaction with two (2) reactants, the apparatus may be modified to accommodate any number of different reactants. For example, a trinary or even quaternary set of reactants may be readily accommodated by modifying the structure to join the activated reactants at a shared reaction interface.

Figure 25A:
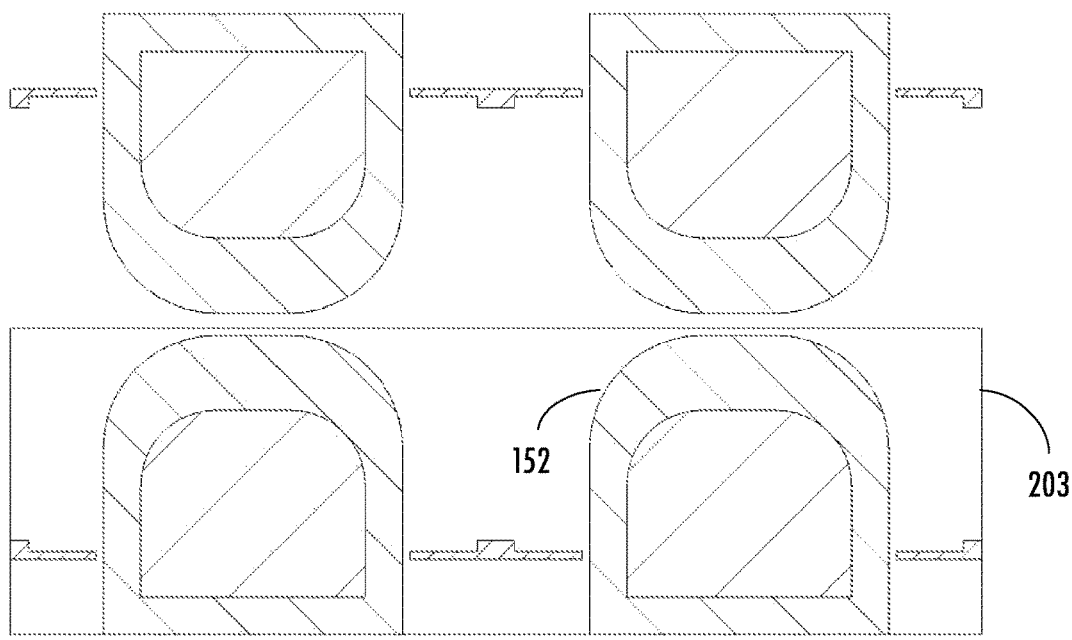
FIGS. 25A-25B provide cross-sectional and perspective views of an exemplary Surface Layer Ion Conduction (Surico) cell which includes a raised wall, useful in conjunction with various embodiments described herein.
Figure 25B:
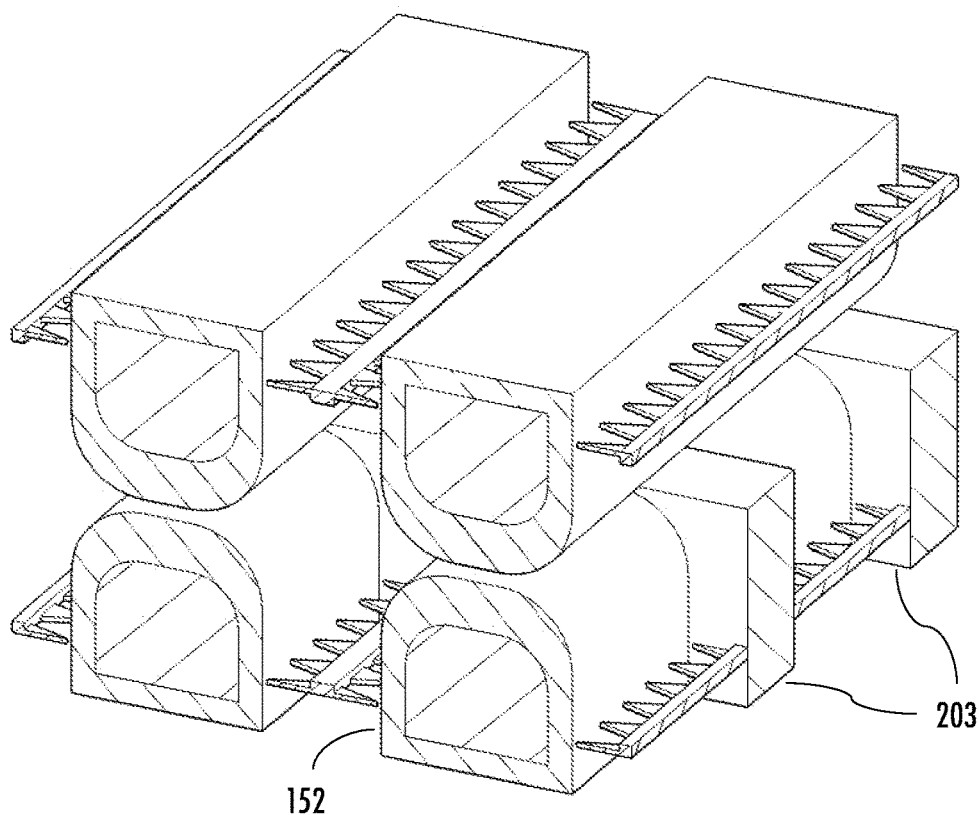

As previously alluded to, surface layer ion conduction requires the activated reactant ions to come within close proximity to one another (a few Angstroms) such that the chemical potential contained in the reactants is sufficient to complete a redox reaction. Certain manufacturing technologies enable manufacturing at this degree of granularity (e.g., atomic layer deposition (ALD) such as is commonly used in semiconductor lithography). Notably however, certain use cases may be subject to movement, physical jarring, and/or deformation. To these ends, various embodiments may use a dielectric wall to reinforce and maintain the requisite proximity between transport media. FIGS. 25A-25B provide cross-sectional and perspective views of an exemplary Surico cell which includes a raised wall (203). The raised wall is slightly taller than the adjacent dielectric (152). The raised wall is used to maintain a specific separation of the anode array below and cathode array above. In one embodiment of the invention, this separation is very narrow, on the order of Angstroms. As shown in FIG. 25B, raised wall may be repeated throughout the structure to provide enhanced rigidity and uniformity. The illustrated embodiment shows only the anode wall; however, both the anode and cathode arrays may incorporate raised walls.

In some cases, relative motion between the transport media (1704, 1754) at the reaction interface 1706 may be desirable. For example, relative motion may facilitate the circulation of activated reactants and exhaust products (exhaust). Specifically, relative motion of the layers may enhance the flow of chemical reactants to the reaction interface, and chemical products away from the reaction interface. Additionally, in some cases, motion can temporarily agitate ion movement and reduce the electric field in the double layer region, enabling ion pair recombination and/or reduce the hazard of dielectric breakdown. For example, high frequency compression of the cell may strengthen the electric field in the double layer. Notably, the electric field propagates faster that the ion motion responsible for dielectric breakdown, hence higher average field strengths may be achieved while still avoiding dielectric breakdown.

Figure 26:
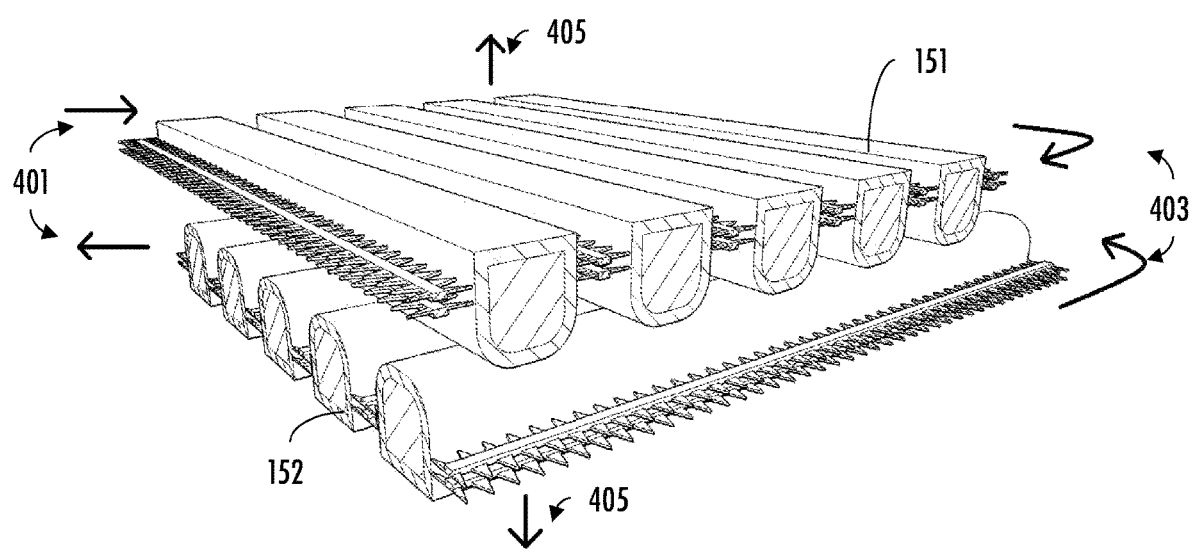
FIG. 26 is a graphical representation of one exemplary apparatus that allows relative movement between the apparatus layers, useful in conjunction with various embodiments described herein.

FIG. 26 shows one exemplary apparatus that allows relative movement between the apparatus layers; relative motion may include sliding motion, twisting motion, rotational motion, high frequency vibrations, standing waves, etc. During relative motion operation three (3) general modes of motion are illustrated by arrows including sliding translational motion 401, up and down separation and vibration motion (405) and rotational and twisting motion (403). Motion may be "relative" e.g., where the apparatus layers move in different directions relative to one another; in some cases, motion may also be "concerted" where the layers move in the same direction relative to one another. In some cases, certain types of motion may cause dynamic deformations that affect the reaction interface (and/or reaction rates); examples of such motion may include vibration, twisting, and bending motions.

As previously alluded to, activation energy may be affected by a variety of different factors including mechanical agitation, thus certain embodiments of the present disclosure may incorporate motion to further facilitate chemical reactions. In one "motion activated power generator" embodiment, the apparatus gains a significant amount of energy output from the relative motion of the top and bottom array. As shown in FIG. 26, the anode and cathode array are not necessarily aligned with each other. In one embodiment of the invention the anode and cathode array are positioned approximately at right angles on from another, as shown in FIG. 26. The cathode array may be moved relative to the anode array, and this motion is represented by arrows and includes sliding motion (401), rotational motion (403) and up and down motion (405). In one embodiment of the invention the cathode tip plate dielectric (151) and anode tip plate dielectric (152) are composed of piezoelectric and ferroelectric insulating materials.

The foregoing discussions have presented many different reaction interface implementations. The aforementioned reaction interface implementations described supra are purely illustrative; other geometries, materials, configurations, and/or arrangements may be substituted with equal success, by artisans of ordinary skill, given the contents of the present disclosure.

Referring back to FIG. 17, In one embodiment, the apparatus includes a load component 1708. In one embodiment, the load component 1708 harvests the excess potential that is generated by the chemical reaction. For example, the excess potential may be in the form of electrical current that is pushed/pulled through the load component 1708. In some variants, a portion of the electrical current that is harvested may be used to activate additional reactants (e.g., via tip plates). Chemical reactions that release a significant amount of potential energy may generate enough current to keep the apparatus in a self-sustaining cycle.

As previously alluded to, the foregoing illustrative geometries and/or apparatus constructions may be readily fabricated using lithographic means. As but one such example, atomic layer deposition is a technique used to deposit thin films onto a substrate. A wide range of materials can be deposited using ALD, including oxides, metals, sulfides, and fluorides. ALD can provide ultra-thin nano-layers, including micron to sub-micron size particles, on a variety of substrates. The nano-layers are inherently uniform and pinhole free.

Figure 27A:
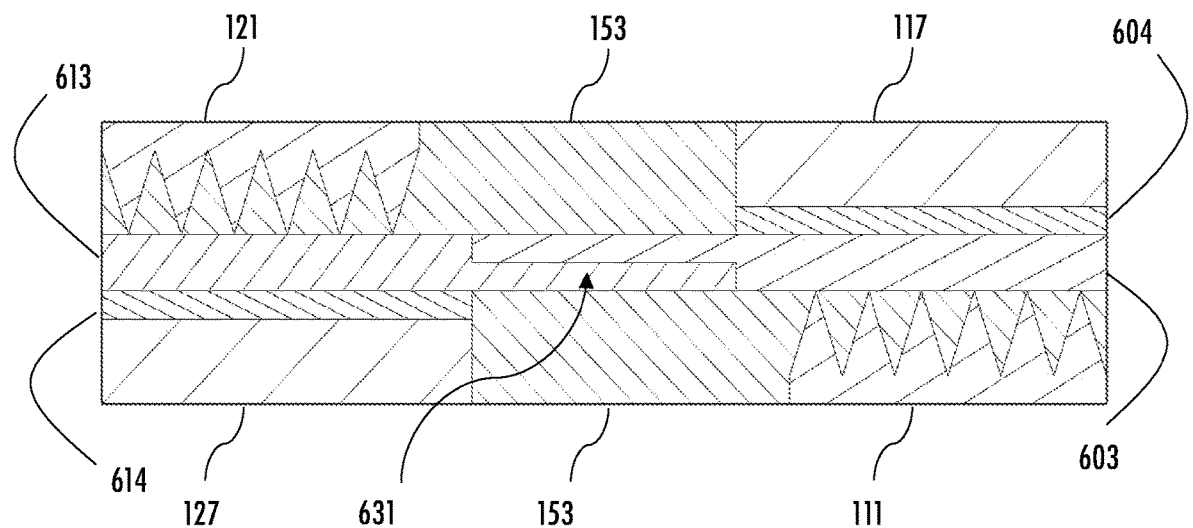
FIGS. 27A-27C depict cross-sectional, perspective, and cut-away views of a Junction Bias (JB) cell geometry suitable for implementation via atomic layer deposition, in accordance with the principles described herein.
Figure 27B:
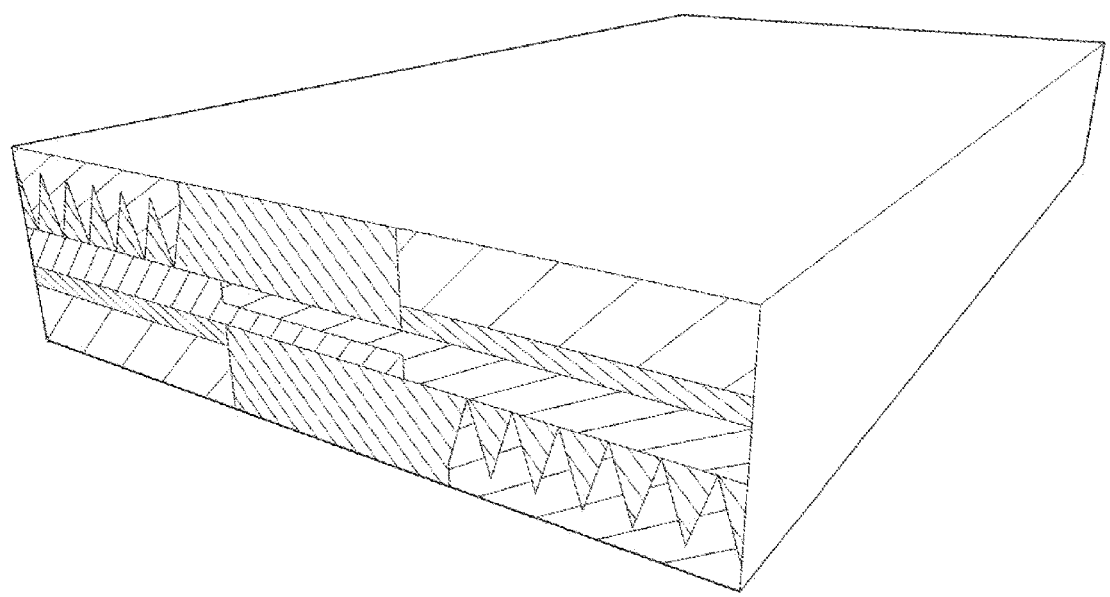
Figure 27C:
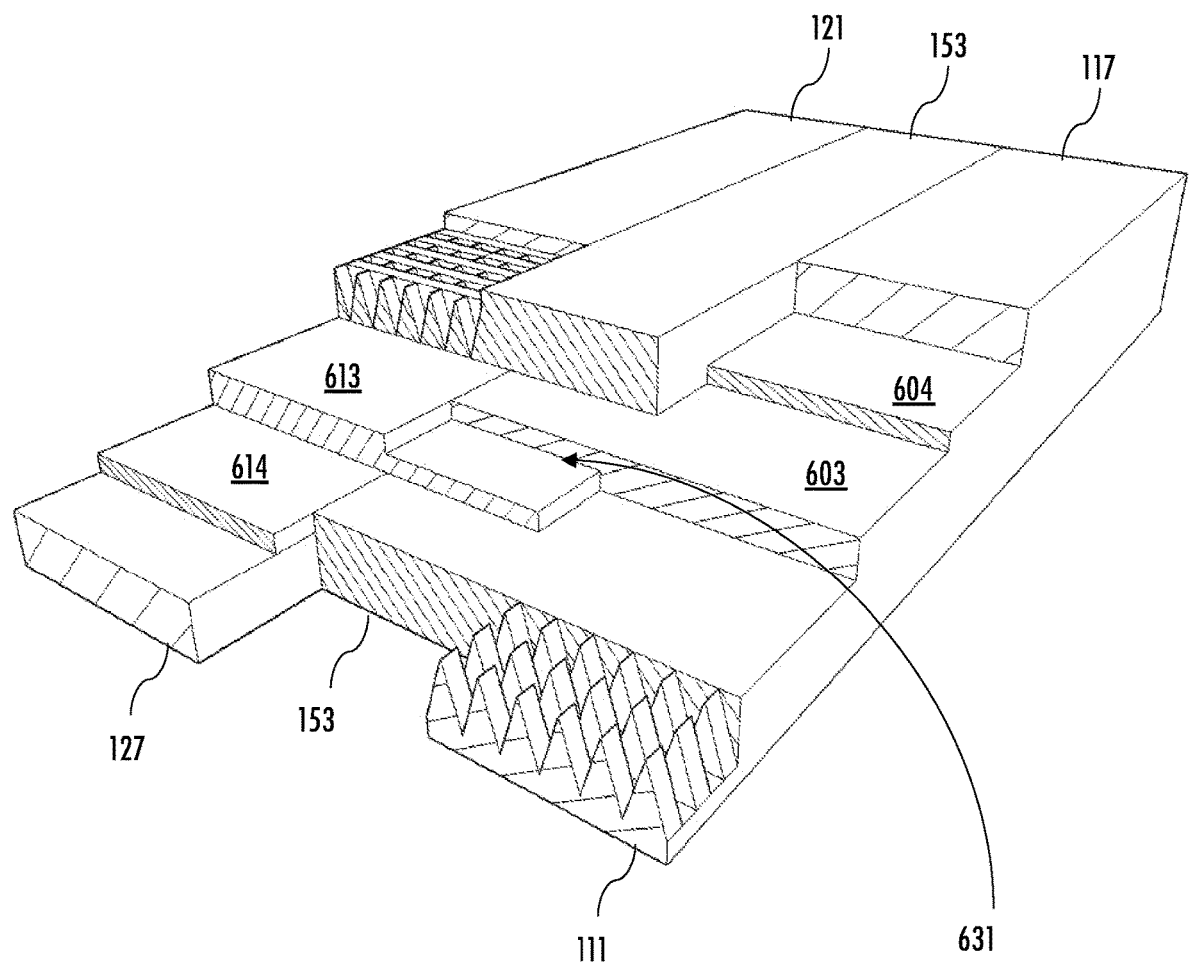

FIGS. 27A-27C depict cross-sectional, perspective, and cut-away views of a Junction Bias (JB) cell geometry suitable for implementation via atomic layer deposition. As shown therein, the cathode (121) includes conducting tips separated by low k dielectric (153). The cathode tips terminate adjacent to and touching the catholyte space (613). The catholyte space may include a cathode polyelectrolyte (613) and is separated from the cathode tip plate (127) by layer (614). Layer (614) is the cathode tip plate electrolysis reduction/prevention layer. The anode (111) includes conducting tips separated by low k dielectric (153). The anode tips point upward and terminate adjacent to and touching the anolyte space (603). The anolyte space may include an anode polyelectrolyte (603). The anolyte fluid space is separated from the anode tip plate (117) by layer (604). Layer (604) is the anode tip plate electrolysis reduction/prevention layer. In one embodiment of the invention the cathode tips and anode tips may be reduced in size or eliminated altogether, leaving just flat anode and cathode surfaces.

As previously noted, the geometry of FIGS. 27A-27C may be repeated and/or extended in the horizontal and/or vertical plane. Other variants may invert and/or stack the geometry vertically providing a densely packed configuration. Additionally, "ribbon" variants may be stretched/lengthened longitudinally. In some cases, a ribbon geometry may be further rolled into a coil or cylindrical form factor (similar to existing battery devices). More generally, artisans of ordinary skill in the related arts will readily appreciate that the fine granularity and the flexibility of design construction offered by such manufacturing processes may be used to create fuel cells of virtually any size, shape, and/or structure.

Figure 28A:
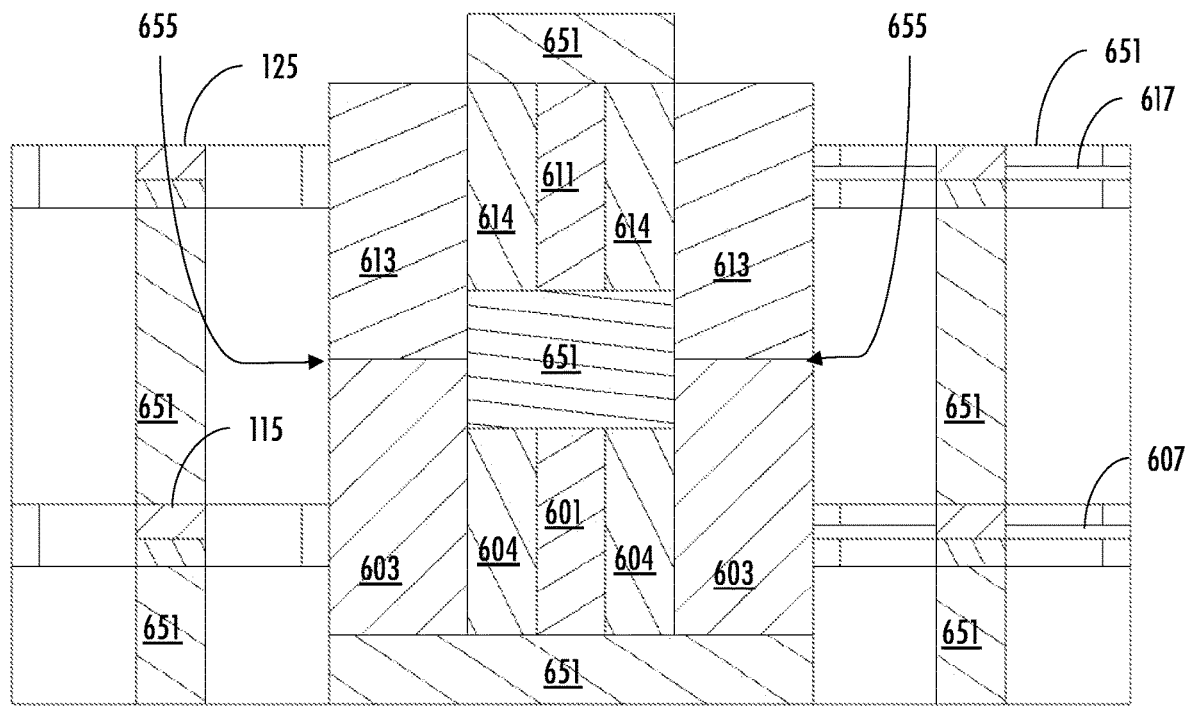
FIGS. 28A-28C depict cross-sectional, perspective, and cut-away views of a Junction Bias (JB) cell geometry suitable for implementation via atomic layer deposition and lithography, in accordance with the principles described herein.
Figure 28B:
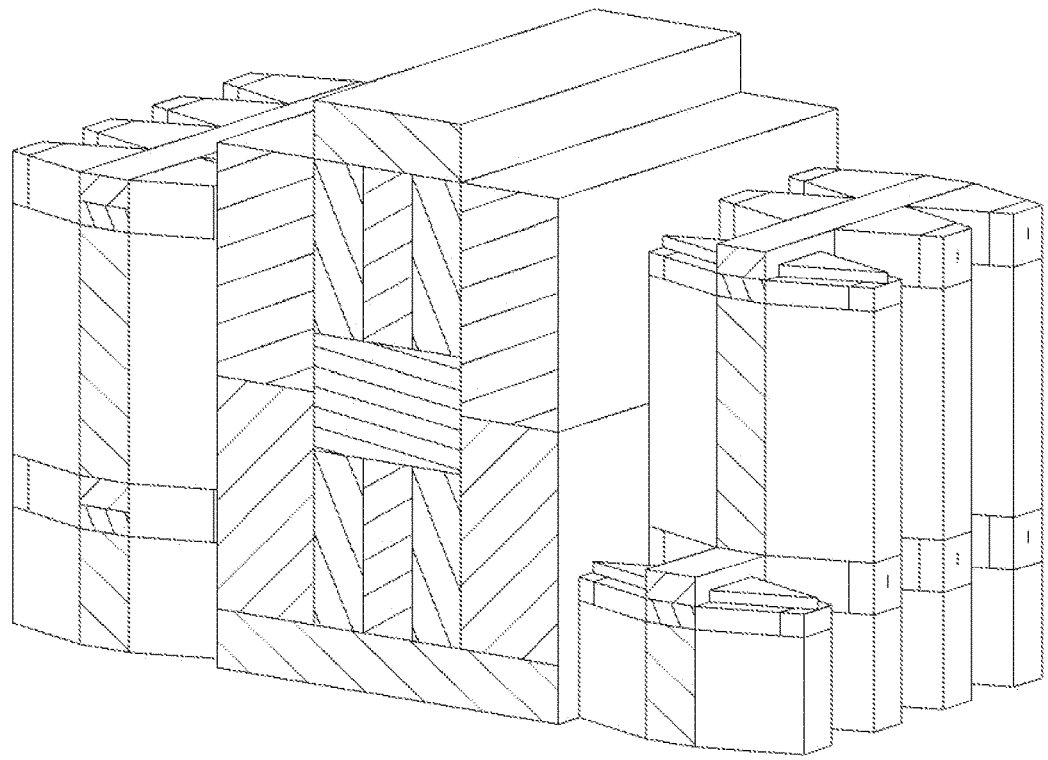
Figure 28C:
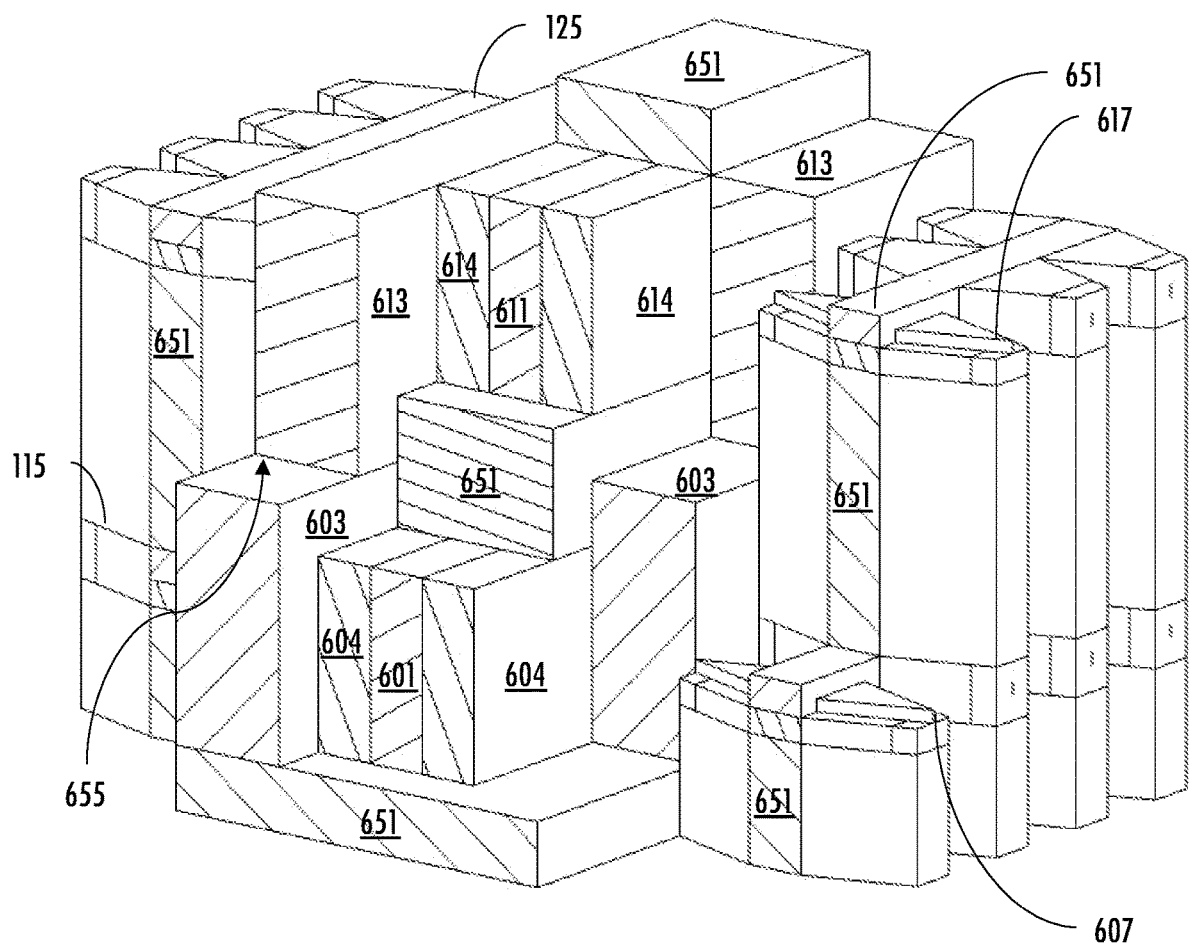

FIGS. 28A-28C depict cross-sectional, perspective, and cut-away views of a JB cell geometry suitable for implementation via atomic layer deposition and lithography. As shown therein, the geometry may be created by using lithographic process technology, building on a single wafer and/or chip. In the illustrated embodiment, the cathode tip plate (611) is bounded above and below by dielectric (651). The cathode tip plate is bounded left and right by the cathode electrolysis reduction layer (614). The cathode electrolysis reduction layers (614) are in direct contact with the catholyte (613). The catholyte (613) is adjacent to, or touching, the cathode tips (617). The cathode tips are surrounded by dielectric. In one embodiment, the dielectric is a low k dielectric. The cathode tips connect electrically to the cathode current collector. Similarly, the anode tip plate (601) is bounded above and below by dielectric (651). The anode tip plate (601) is bounded left and right by the anode tip plate electrolysis reduction layer (604). The anode tip plate electrolysis reduction layers (604) are in direct contact the anolyte (603). The anolyte (604) is adjacent to, or touching, the anode tips (607). The anode tips are surrounded by dielectric. In one embodiment, the dielectric is a low k dielectric. The anode tips connect electrically to the anode current collector.

In one embodiment, the free space between cell components may be separated into oxygen (oxidant) plenum space and fuel (reductant) plenum space. The oxygen plenum space may be filled with any material that aids the storage and/or transport of the oxidizing molecules to the cathode tips. An example fluid to fill the oxygen plenum space is perfluorodecalin containing oxygen. The fuel plenum space may be filled with any material that aids the storage and/or transport of fuel molecules to the anode tips.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:

1. An electrode array apparatus, comprising:
   an electrode coupled to a load;
   an electrode tip plate configured to pull electrical charge from the electrode, the electrical charge configured to ionize a reactant into an ionized reactant;
   a transport media configured to transport the ionized reactant to a reaction interface; and
   where the reaction interface prevents a transfer of the ionized reactant across the reaction interface but is configured to permit electron sharing to neutralize the ionized reactant.

2. The electrode array apparatus of claim 1, where the electrode comprises an anode; and
   the electrode tip plate is configured to pull positive charge from the anode.

3. The electrode array apparatus of claim 2, further comprising an anion permeable electrolyte in contact with a cathode.

4. The electrode array apparatus of claim 3, where the cathode and the anode are asymmetrically shaped.

5. The electrode array apparatus of claim 1, where the electrode comprises a cathode; and
   the electrode tip plate is configured to pull negative charge from the cathode.

6. The electrode array apparatus of claim 5, further comprising a cation permeable electrolyte in contact with an anode.

7. The electrode array apparatus of claim 1, where the transport media comprises a lattice of immobile sites.

8. An electrode array apparatus, comprising:
   an electrode assembly configured to generate reactant ions at a first electrical interface;

a first transport media configured to transport the reactant ions from the first electrical interface to a reaction interface;

where the first transport media isolates the reactant ions from other reactant ions; and where the reaction interface allows the reactant ions and the other reactant ions to react and create a neutrally charged product.

9. The electrode array apparatus of claim 8, where the first transport media comprises a first immobile lattice configured to permit the reactant ions to diffuse from a first electrical double layer at the first electrical interface to an ionic double layer interface at the reaction interface.

10. The electrode array apparatus of claim 9, comprising:
an electrode coupled to a load and an electrode tip plate coupled to a tip plate potential; and
the first transport media comprises an exchange membrane.

11. The electrode array apparatus of claim 10, where the reaction interface is a bipolar membrane interface comprising a portion of the exchange membrane in contact with a corresponding portion of an other exchange membrane.

12. The electrode array apparatus of claim 8, where:
the electrode assembly comprises an electrode coupled to a load and an electrode tip plate coupled to a tip plate potential; and
the first transport media comprises a first dielectric.

13. The electrode array apparatus of claim 12, where the first dielectric permits a first electric field generated by the electrode tip plate to attract the reactant ions and migrate to the reaction interface via surface layer conduction along the first dielectric.

14. The electrode array apparatus of claim 13, where the reaction interface is a physical gap between the first dielectric and an other dielectric.

15. The electrode array apparatus of claim 8, where the neutrally charged product comprises carbon dioxide that may be passively vented from the reaction interface.

16. The electrode array apparatus of claim 8, where the neutrally charged product comprises water that may be passively vented from the reaction interface.

17. A electrode array apparatus, comprising:
an electrode assembly configured to generate first ionic charge carriers at a first electrical interface;
a load component coupled to at least the electrode assembly;
a first transport media configured to transport the first ionic charge carriers from the first electrical interface to a reaction interface;
where the reaction interface prevents a transfer of the first ionic charge carriers across the reaction interface but permits electron sharing across the reaction interface; and
where the reaction interface pulls an electrical current across the load component to generate a neutrally charged product.

18. The electrode array apparatus of claim 17, where the first transport media comprises a dielectric surface.

19. The electrode array apparatus of claim 17, where the reaction interface comprises an ionic depletion region that is characterized by a fixed width and a variable voltage step.

20. The electrode array apparatus of claim 19, where an electrochemical potential of the first ionic charge carriers and an other ionic charge carrier exceeds the variable voltage step.

* * * * *